(12) United States Patent
Sogabe et al.

(10) Patent No.: US 8,369,905 B2
(45) Date of Patent: Feb. 5, 2013

(54) POWER TRANSMISSION CONTROL DEVICE, POWER TRANSMISSION DEVICE, POWER RECEIVING CONTROL DEVICE, POWER RECEIVING DEVICE, AND ELECTRONIC APPARATUS

(75) Inventors: Haruhiko Sogabe, Chino (JP); Yoichiro Kondo, Chino (JP); Kota Onishi, Nagoya (JP); Masayuki Kamiyama, Nagoya (JP); Nobutaka Shiozaki, Nagoya (JP); Takahiro Kamijo, Fujimi-cho (JP)

(73) Assignee: Seiko Epson Corporation, Tokyo (JP)

( * ) Notice: Subject to any disclaimer, the term of this patent is extended or adjusted under 35 U.S.C. 154(b) by 738 days.

(21) Appl. No.: 12/503,475

(22) Filed: Jul. 15, 2009

(65) Prior Publication Data

US 2010/0013322 A1    Jan. 21, 2010

(30) Foreign Application Priority Data

Jul. 16, 2008  (JP) ................................. 2008-185400

(51) Int. Cl.
*H04B 1/38*    (2006.01)
(52) U.S. Cl. .......... 455/573; 455/522; 455/69; 455/574; 320/115; 323/355; 379/443; 307/104; 307/140
(58) Field of Classification Search .................. 455/573, 455/522, 69, 403, 24, 550.1, 556.1, 572, 455/574; 320/108, 109, 115; 323/355; 379/443; 370/104, 140, 150
See application file for complete search history.

(56) References Cited

U.S. PATENT DOCUMENTS

| | | | |
|---|---|---|---|
| 7,109,682 B2 * | 9/2006 | Takagi et al. .................. | 320/108 |
| 7,233,137 B2 * | 6/2007 | Nakamura et al. ............ | 323/355 |
| 8,054,036 B2 * | 11/2011 | Onishi et al. .................. | 320/108 |
| 2004/0145342 A1 * | 7/2004 | Lyon .............................. | 320/108 |
| 2006/0287763 A1 * | 12/2006 | Ochi et al. ..................... | 700/231 |
| 2009/0322280 A1 * | 12/2009 | Kamijo et al. ................ | 320/108 |
| 2009/0322281 A1 * | 12/2009 | Kamijo et al. ................ | 320/108 |
| 2010/0013319 A1 * | 1/2010 | Kamiyama et al. ........... | 307/104 |
| 2010/0013322 A1 * | 1/2010 | Sogabe et al. ................ | 307/104 |

FOREIGN PATENT DOCUMENTS

| | | |
|---|---|---|
| JP | A-7-85225 | 3/1995 |
| JP | A-2006-60909 | 3/2006 |
| JP | A-2006-517378 | 7/2006 |

* cited by examiner

*Primary Examiner* — Shaima Q Aminzay
(74) *Attorney, Agent, or Firm* — Oliff & Berridge, PLC

(57) ABSTRACT

A power transmission control device provided in a power transmission device included in a contactless power transmission system in which power is transmitted from the power transmission device to a power receiving device by electromagnetically coupling a primary coil and a secondary coil and the power is supplied to a load of the power receiving device includes a controller controlling the power transmission control device. The controller includes a communication condition setting section setting, by exchanging information with the power receiving device, a communication condition that is at least one of a communication method between the power transmission device and the power receiving device and a communication parameter, and a communication processing section performing a communication processing between the power transmission device and the power receiving device by using the set communication condition.

19 Claims, 15 Drawing Sheets

POWER TRANSMISSION CONTROL DEVICE, POWER TRANSMISSION DEVICE, POWER RECEIVING CONTROL DEVICE, POWER RECEIVING DEVICE, AND ELECTRONIC APPARATUS

The present application claims a priority based on Japanese Patent Application No. 2008-185400 filed on Jul. 16, 2008, the contents of which are incorporated herein by reference.

BACKGROUND

1. Technical Field

The present invention relates to a power transmission control device, a power transmission device, a power receiving control device, a power receiving device, and an electronic apparatus.

2. Related Art

In recent years, contactless power transmission (non-contact power transmission) has been highlighted. The contactless power transmission makes it possible to perform transmission of electric power by utilizing electromagnetic induction without using a metallic contact. As an example of the contactless power transmission, charging cell phones and household equipment (e.g., cordless handsets of telephones) are suggested.

JP-A-2006-60909 is a first example of related art of the contactless power transmission. In the first example, an ID authentication is realized by transmitting and receiving an authentication code between a power receiving device (a secondary side) and a power transmission device (a primary side) so as to detect insertion of a foreign object or the like.

The related art disclosed in the example, however, is only on the assumption that a single power transmission device corresponds to a single power receiving device. The power transmission device is determines only whether or not a device ID received from the power receiving device is appropriate. The related art is, thus, not on the assumption that the power transmission device needs to correspond with various types of power receiving devices.

SUMMARY

An advantage of the invention is to provide a power transmitting control device, a power transmission device, a power receiving control device, a power receiving device, and an electronic apparatus that have broad utility.

According to a first aspect of the invention, a power transmission control device is provided in a power transmission device included in a contactless power transmission system in which power is transmitted from the power transmission device to a power receiving device by electromagnetically coupling a primary coil and a secondary coil and the power is supplied to a load of the power receiving device. The power transmission control device includes a controller controlling the power transmission control device. The controller includes a communication condition setting section setting, by exchanging information with the power receiving device, a communication condition that is at least one of a communication method between the power transmission device and the power receiving device and a communication parameter, and a communication processing section performing a communication processing between the power transmission device and the power receiving device by using the set communication condition.

According to the first aspect of the invention, the communication condition, which is at least one of the communication method and the communication parameter, is set by exchanging information between the power transmission device and the power receiving device. With the communication condition, the communication processing is performed between the power transmission device and the power receiving device. This structure makes it possible to set different communication conditions in accordance with power receiving devices. As a result, the general versatility of the power transmission control device can be improved.

In this case, the communication processing section may perform, by using the communication condition, a communication processing after a start of normal power transmission between the power transmission device and the power receiving device.

Accordingly, the communication processing after the start of the normal power transmission is performed by using the communication condition set by exchanging information between the power transmission device and the power receiving device. As a result, communication can be performed with the optimum communication condition corresponding to periods in the normal power transmission.

In this case, the communication processing section may perform the communication processing between the power transmission device and the power receiving device by using an initial communication condition before the start of the normal power transmission, and the communication condition setting section may exchange information with the power receiving device in a communication processing before the start of the normal power transmission using the initial communication condition so as to set the communication condition used in the communication processing after the start of the normal power transmission.

In this way, information is exchanged in communication under the initial communication condition before the start of the normal power transmission so as to set communication condition after the start of the normal power transmission, whereby communication after the start of the normal power transmission can be performed by using the communication condition. Therefore, it is possible to communicate with an optimum communication condition in accordance with each of the period before the start of the normal power transmission and the period after the start of the normal power transmission. As a result, quality of communication can be improved.

In the power transmission control device, in a case where a communication from the power transmission device to the power receiving device is performed by a frequency modulation, the communication condition setting section may set a frequency in the frequency modulation as the communication parameter of the communication condition.

According to the structure described above, the frequency used in the frequency modulation is set as the communication parameter by exchanging information between the power transmission device and the power receiving device. With the set frequency, communication can be performed by the frequency modulation.

In the power transmission control device, in a case where a communication from the power receiving device to the power transmission device is performed by a load modulation, the communication condition setting section may set a threshold in the load modulation as the communication parameter of the communication condition.

According to the structure described above, the threshold used in the load modulation is set as the communication parameter by exchanging information between the power transmission device and the power receiving device. With the set threshold, communication can be performed by the load modulation.

In the power transmission control device, in a case where a periodic authentication is performed from the power receiving device to the power transmission device after the start of the normal power transmission, the communication condition setting section may set a threshold for the periodic authentication as the communication parameter of the communication condition.

According to the structure described above, the threshold used in the periodic authentication is set as the communication parameter by exchanging information between the power transmission device and the power receiving device. With the set threshold, the periodic authentication after the start of the normal power transmission can be performed.

In the power transmission control device, the communication condition setting section may receive communication condition information from the power receiving device so as to set the communication condition.

This structure enables the power transmission device to communicate with the power receiving device in accordance with the communication condition information from the power receiving device. As a result, the power transmission device can readily manage various types of the power receiving devices.

In the power transmission control device, the controller may include a negotiation processing section performing a negotiation processing of contactless power transmission, and a setup processing section performing a setup processing of the contactless power transmission based on a result of the negotiation processing. The communication condition setting section may receive the communication condition information from the power receiving device by the setup processing.

As a result, the communication condition can be set by effectively utilizing the setup processing.

In this case, the negotiation processing section may perform a collation processing on system information showing standard information, coil information, a load state detection method with respect to the power receiving device.

Accordingly, whether or not information can be communicated with the power receiving device and whether or not the communicated information is adequate can be confirmed in the negotiation processing which is executed at an early stage of the setup processing.

According to a second aspect of the invention, a power transmission device includes the power transmission control device of the first aspect, and a power transmission section generating an alternating-current voltage so as to supply the voltage to the primary coil.

According to a third aspect of the invention, an electronic apparatus includes the power transmission device of the second aspect.

According to a fourth aspect of the invention, a power receiving control device is provided in a power receiving device included in a contactless power transmission system in which power is transmitted from a power transmission device to the power receiving device by electromagnetically coupling a primary coil and a secondary coil and the power is supplied to a load of the power receiving device. The power receiving control device includes a controller controlling the power receiving control device. The controller includes a communication condition setting section setting, by exchanging information with the power transmission device, a communication condition that is at least one of a communication method between the power transmission device and the power receiving device, and a communication processing section performing a communication processing between the power transmission device and the power receiving device by using the set communication condition.

According to the fourth aspect of the invention, the communication condition, which is at least one of the communication method and the communication parameter, is set by exchanging information between the power transmission device and the power receiving device. With the communication condition, the communication processing is performed between the power transmission device and the power receiving device. As a result, the general versatility of the power receiving control device can be improved.

In this case, the communication processing section may perform, by using the communication condition, a communication processing after a start of normal power transmission between the power transmission device and the power receiving device.

Accordingly, the communication processing after the start of the normal power transmission is performed by using the communication condition set by exchanging information between the power transmission device and the power receiving device. As a result, communication can be performed with the optimum communication condition corresponding to periods in the normal power transmission.

In this case, the communication processing section may perform the communication processing between the power transmission device and the power receiving device by using an initial communication condition before the start of the normal power transmission, and the communication condition setting section may exchange information with the power transmission device in a communication processing before the start of the normal power transmission so as to set the communication condition used in the communication processing after the start of the normal power transmission.

In this way, information is exchanged in communication under the initial communication condition before the start of the normal power transmission so as to set communication condition after the start of the normal power transmission, whereby communication after the start of the normal power transmission can be performed by using the communication condition. Therefore, it is possible to communicate with an optimum communication condition in accordance with each of the period before the start of the normal power transmission and the period after the start of the normal power transmission. As a result, quality of communication can be improved.

In the power receiving control device, the communication condition setting section may transmit communication condition information to the power transmission device so as to set the communication condition.

As a result, communication can be performed in accordance with the communication condition information transmitted to the power transmission device.

In the power receiving control device, the controller may include a negotiation processing section performing a negotiation processing of contactless power transmission, and a setup processing section performing a setup processing of the contactless power transmission based on a result of the negotiation processing. The communication condition setting section may transmit the communication condition information to the power transmission device by the setup processing.

As a result, the communication condition can be set by effectively utilizing the setup processing.

According to a fifth aspect of the invention, a power receiving device includes the power receiving control device of the fourth aspect, and a power receiving section that converts an induced voltage in the secondary coil into a direct-current voltage.

According to a sixth aspect of the invention, an electronic apparatus includes the power receiving device of the fifth aspect; and a load to which power is supplied by the power receiving device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described in detail below. The embodiments explained below do not unduly limit the contents of the invention described in the claims and all of the structures explained in the embodiments are not indispensable for the solving means of the invention.

1. Electronic Apparatus

Figure 1A:
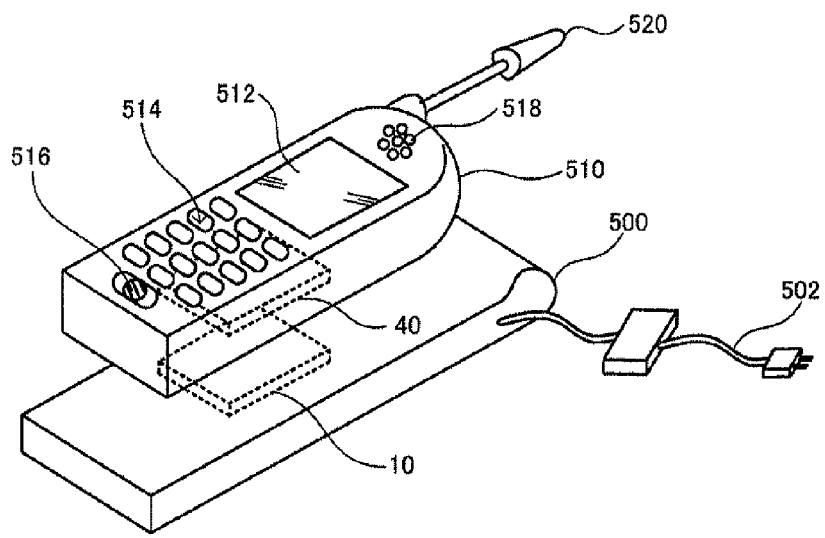
FIGS. 1A, 1B, and 1C are schematic views explaining contactless power transmission.

FIG. 1A shows an example of an electronic apparatus employing a contactless power transmission method according to an embodiment of the invention. A charger 500 (a cradle) that is one of electronic apparatuses includes a power transmission device 10. A cell phone 510 that is one of electronic apparatuses includes a power receiving device 40. The cell phone 510 includes a display 512 such as an LCD, an operation section 514 composed of buttons and the like, a microphone 516 (a voice input section), a speaker 518 (a voice output section), and an antenna 520.

Power is supplied to the charger 500 through an AC adapter 502, and the power is transmitted from the power transmission device 10 to the power receiving device 40 by contactless power transmission. Accordingly, a battery of the cell phone 510 can be charged and devices in the cell phone 510 can be operated.

The electronic apparatus according to the embodiment is not limited to the cell phone 510. The embodiment is applicable to various electronic apparatuses such as watches, cordless phones, shavers, electric toothbrushes, wrist computers, handy terminals, personal digital assistants, electric bicycles, and IC cards.

Figure 1B:
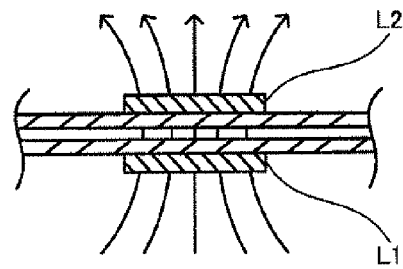

As schematically shown in FIG. 1B, power is transmitted from the power transmission device 10 to the power receiving device 40 by electromagnetically coupling a primary coil L1 (a power transmission coil) provided on the power transmission device 10 side and a secondary coil L2 (a power receiving coil) provided on the power receiving device 40 side and thus forming a power transmission transformer. This structure enables non-contact power transmission to be performed.

In FIG. 1B, the primary coil L1 and the secondary coil L2 are, for example, a flat coil having an air-core formed by winding a coil wire in a spiral manner on a plane. The coil of the embodiment is not limited to this. Any coil can be employed regardless of its shape, structure, and the like as long as one can be used to transmit power by electromagnetically coupling the primary coil L1 and the secondary coil L2.

Figure 1C:
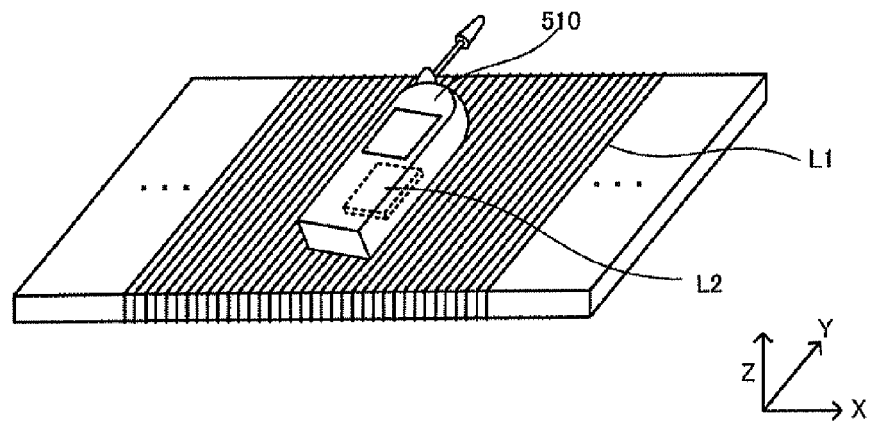

For example, referring to FIG. 1C, the primary coil L1 is formed by winding a coil wire in a spiral manner about an X axis of a magnetic substance core. The secondary coil L2 provided in the cell phone 510 is similarly formed. The embodiment is also applicable to the coil shown in FIG. 1C. In a case shown in FIG. 1C, as the primary coil L1 and the secondary coil L2, a coil formed by winding a coil wire about a Y axis may be used other than the coil formed by winding the coil wire about the X axis.

2. Power Transmission Device and Power Receiving Device

Figure 2:
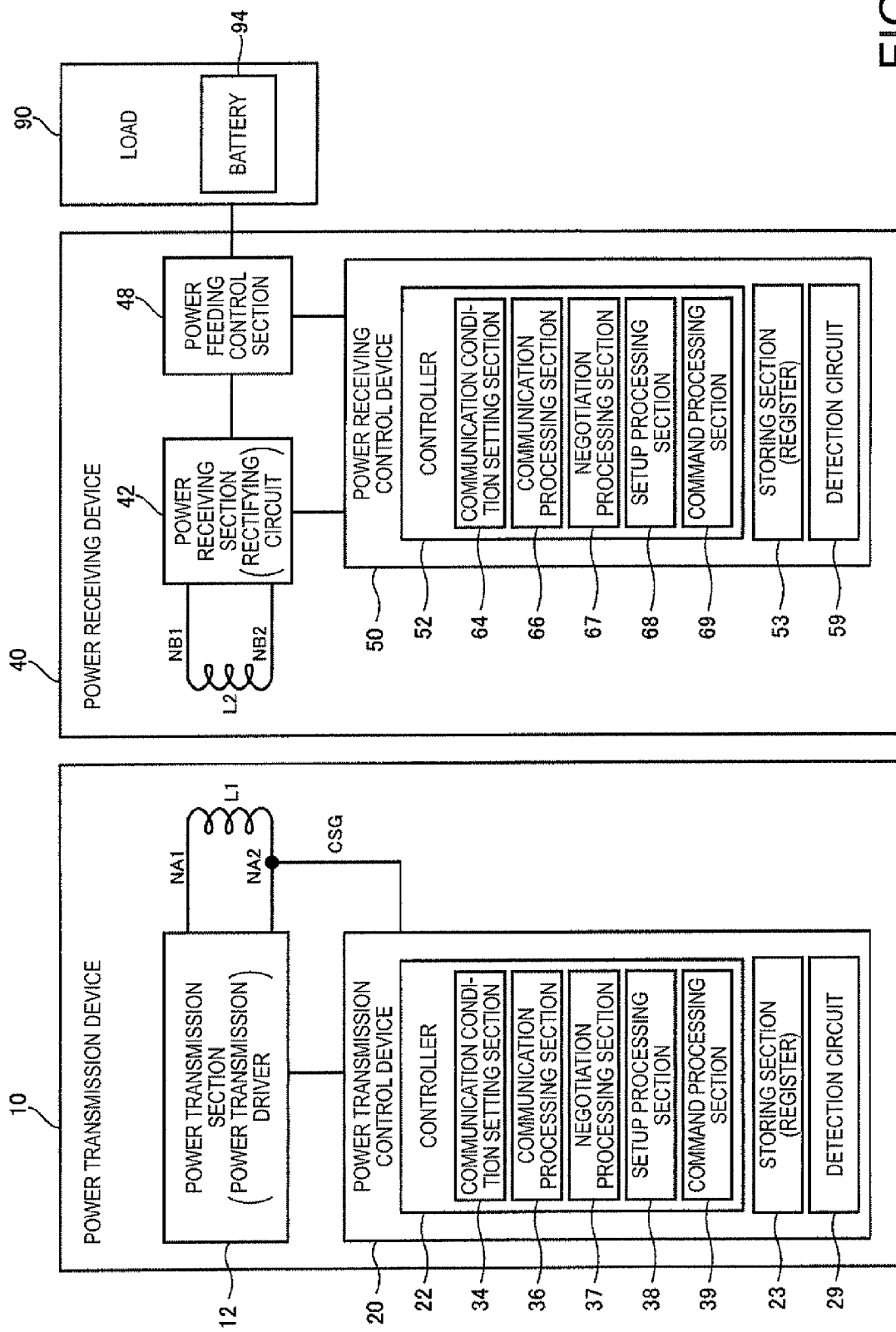
FIG. 2 is a structural example of a power transmission device, a power transmission control device, a power receiving device, and a power receiving control device according to an embodiment.

FIG. 2 shows a structural example of the power transmission device 10, a power transmission control device 20, the power receiving device 40, and a power receiving control device 50 according to the embodiment. The electronic apparatus, such as the charger 500 shown in FIG. 1A, used on a power transmission side includes the power transmission device 10 shown in FIG. 2. The electronic apparatus, such as the cell phone 510, used on a power receiving side may include the power receiving device 40 and a load 90 (main load). Based on a structure shown in FIG. 2, a contactless power transmission (non-contact power transmission) system is realized in which the primary coil L1 and the secondary coil L2 are electromagnetically coupled so as to transmit power from the power transmission device 10 to the power receiving device 40 to supply the power to the load 90, for example.

The power transmission device 10 (a power transmission module, a primary module) may include the primary coil L1, a power transmission section 12, and the power transmission control device 20. The structures of the power transmission device 10 and the power transmission control device 20 are not limited to those shown in FIG. 2, and various modifications, such as omitting a part of components (e.g., the primary coil), adding another component (e.g., a waveform monitor circuit), and changing connections, can be made.

The power transmission section 12 generates an alternating-current (AC) voltage, and supplies it to the primary coil L1. Specifically, the power transmission section 12 generates an AC voltage having a predetermined frequency at transmitting power while generates an AC voltage having a frequency varied corresponding to data at transmitting the data, thereby supplying it to the primary coil L1. The power transmission section 12 may include, for example, a first power transmission driver for driving one end of the primary coil L1, a second power transmission driver for driving the other end of the primary coil L1, and at least one capacitor forming a resonance circuit together with the primary coil L1. Each of the first and the second power transmission drivers included in the power transmission section 12 is an inverter circuit (a buffer circuit) composed of, for example, a power MOS transistor, and is controlled by the power transmission control device 20.

The primary coil L1 (a power transmission side coil) and the secondary coil L2 (a power receiving side coil) are electromagnetically coupled so as to form a power transmission transformer. For example, when the power transmission is required, as shown in FIGS. 1A and 1B, the cell phone 510 is placed on the charger 500 so that magnetic flux of the primary coil L1 passes through the secondary coil L2. On the other hand, when the power transmission is not required, the cell phone 510 is physically separated from the charger 500 so that the magnetic flux of the primary coil L1 does not pass through the secondary coil L2.

The power transmission control device 20 performs various controls of the power transmission device 10, and can be realized by an integrated circuit (IC) device or the like. The power transmission control device 20 may include a controller 22, a storing section 23, and a detection circuit 29. In this regard, modifications such as omitting a part of the components of or adding another component to the power transmission control device 20 can be made.

The controller 22 (on the power transmission side) controls the power transmission device 10 and the power transmission control device 20. The controller 22 can be realized by an ASIC circuit such as a gate array, a micro computer with a program operating on the micro computer, or the like. The controller 22 controls power transmission using the power transmission section 12, storage of the storing section 23, and the detection circuit 29. Specifically, the controller 22 controls various sequences and performs a determination processing required for power transmission, load state detection (data detection, foreign object detection, removal detection, and the like), a frequency modulation, and the like.

The storing section 23 (a register section) stores various information, and can be realized by, for example, RAMs, D flip-flops, or nonvolatile memories such as flush memories and mask ROMs.

The detection circuit 29 detects data transmitted from the power receiving device 40. For example, if data is transmitted from the power receiving device 40 by load modulation, the detection circuit 29 detects the transmitted date by detecting a load state on the power receiving side (power receiving device or foreign object). The load state detection can be realized by detecting variations in the waveform of an induced voltage signal (a coil terminal signal) of the primary coil L1. For example, a variation in a load state (a load current) on the power receiving side (the secondary side) induces a variation in the waveform of the induced voltage signal. The detection circuit 29 detects the variation in the waveform, and outputs a detection result (detection result information) to the controller 22. Then, the controller 22, based on the detection information of the load state by the detection circuit 29, determines the load state (load fluctuation, a degree of the load) on the power receiving side (the secondary side) so as to achieve the data detection. Alternatively, the foreign object detection, the removal detection, and the like may be achieved by detecting a variation in a load state.

The data detection method on the power transmission side is not limited to such load state detection method. Detection methods of various non-contact ways can be employed. For example, RF-ID tags are provided to the power receiving side and the power transmission side so that data is received from the power receiving side by using the RF-ID tags. Alternatively, data may be transmitted to the power receiving side by using the RF-ID tags.

The power receiving device 40 (a power receiving module, a secondary module) may include the secondary coil L2, a power receiving section 42, a power feeding control section 48, and the power receiving control device 50. The structures of the power receiving device 40 and the power receiving control device 50 are not limited to those shown in FIG. 2, and various modifications, such as omitting a part of components (e.g., the secondary coil), adding another component (e.g., a load modulation section), and changing connections, can be made.

The power receiving section 42 converts an alternating-current induced voltage of the secondary coil L2 into a direct-current voltage. The conversion can be realized by a rectifying circuit and the like included in the power receiving section 42.

The power feeding control section 48 controls power feeding to the load 90. That is, the power feeding control section 48 controls turning on/off the power feeding to the load 90. Specifically, a level of the direct-current voltage from the power receiving section 42 (the rectifying circuit) is regulated so as to generate a power supply voltage. Thereafter, the power supply voltage is supplied to the load 90 so as to charge a battery 94 of the load 90. The load 90 may not include the battery 94.

The power receiving control device 50 performs various controls of the power receiving device 40, and can be realized by an integrated circuit (IC) device or the like. The power receiving control device 50 may operate with a power supply voltage generated from the induced voltage of the secondary coil L2. The power receiving control device 50 may include a controller 52, a storing section 53, and a detection circuit 59.

The controller 52 (on the power receiving side) controls the power receiving device 40 and the power receiving control device 50. The controller 52 can be realized by an ASIC circuit such as a gate array, a micro computer with a program operating on the micro computer, or the like. The controller 52 controls the power feeding control section 48 and storage of the storing section 53. Specifically, the controller 52 controls various sequences and performs a determination processing required for position detection, frequency detection, load modulation, full charge detection, and the like.

The storing section 53 (a register section) stores various information, and can be realized by, for example, RAMs, D flip-flops, or nonvolatile memories such as flush memories and mask ROMs.

The detection circuit 59 detects data transmitted from the power transmission device 10. For example, if data is transmitted from the power transmission device 10 by frequency modulation, the detection circuit 59 detects the data by detecting a variation in the frequency.

The data detection method on the power receiving side is not limited to such method detecting a frequency variation. Detection methods of various non-contact ways can be employed. For example, as described above, data may be received by using the RF-ID tags.

In the embodiment, the controller 22, on the power transmission side, includes a communication condition setting section 34 and a communication processing section 36. Likewise, the controller 52, on the power receiving side, includes a communication condition setting section 64 and a communication processing section 66.

The communication condition setting section 34, on the power transmission side, sets a communication condition by exchanging information with the power receiving device 40. For example, the communication condition is set by receiving communication condition information from the power receiving device 40. Specifically, the communication condition is set by receiving the communication condition information from the power receiving device 40 in a setup processing, which is described later.

On the other hand, the communication condition setting section 64, on the power receiving side, sets a communication condition by exchanging information with the power transmission device 10. For example, the communication condition is set by transmitting communication condition information to the power transmission device 10. Specifically, the communication condition is set by transmitting the communication condition information to the power transmission device 10 in the setup processing, which is described later.

In this way, the communication condition between the power transmission device 10 and the power receiving device 40 can be set by using the communication condition information on the power receiving side. As a result, various types of power receiving devices can be used since the communication condition can be set in accordance with the condition on the power receiving side. The embodiment is not limited to the case where communication condition information (transmission condition information) is transmitted to the power transmission device 10 from the power receiving device 40, and is also applicable to a case where communication condition information is transmitted to the power receiving device 40 from the power transmission device 10.

Here, the communication condition includes a communication method between the power transmission device 10 and the power receiving device 40, and the communication parameters of the method. The communication method may include various modulation methods such as frequency modulation and load modulation, and methods other than modulation methods. For example, a communication method using the RF-ID tag may be employed. The communication parameters are ones used in those communication methods. Examples of the parameters include a frequency used for a frequency modulation in a case of frequency modulation, and a threshold for detecting a load fluctuation in a case of load modulation.

When the communication between the power transmission device 10 and the power receiving device 40 are performed by a frequency modulation, as an example, the communication condition setting section 34 sets a frequency (f2) used in the frequency modulation as a communication parameter in the communication condition. Alternatively, when the communication between the power transmission device 10 and the power receiving device 40 are performed by a load modulation, the communication condition setting section 34 sets thresholds (SIGH, SIGH2) used in the load modulation as a communication parameter in the communication condition. In addition, when a periodic authentication is performed to the power transmission device 10 from the power receiving device 40, after the start of normal power transmission, for detecting what is called a takeover state, the communication condition setting section 34 sets thresholds (LEVEL, LEVH) used for the periodic authentication as a communication parameter in the communication condition. In this regard, when foreign object detection is performed after the start of normal power transmission, the threshold for the foreign object detection after the start of normal power transmission may be set.

The communication processing sections 36 and 66 perform communication processings between the power transmission device 10 and the power receiving device 40 by using communication conditions (communication methods, communication parameters) set by the communication condition setting sections 34 and 64 respectively. Examples of the processings include a processing transmitting data to the power receiving device 40 from the power transmission device 10, and another processing transmitting data to the power transmission device 10 from the power receiving device 40.

An example of the processings is described on a case where a frequency modulation method is set as a communication method for transmitting date to the power receiving device 40 from the power transmission device 10. In this case, the power transmission device 10 transmits data to the power receiving device 40 by a frequency modulation using frequencies (f1, f2) set as the communication parameter. The power receiving device 40 demodulates, by using the frequencies (f1, f2) set as the communication parameter, the data transmitted by the power transmission device 10 so as to receive the data.

Another example of the processings is described on a case where a load modulation method is set as a communication method for transmitting date to the power transmission device 10 from the power receiving device 40. In this case, the power receiving device 40 transmits data to the power transmission device 10 by a load modulation using a communication parameter for the load modulation. The power transmission device 10 detects, by using the thresholds (SIGH, SIGH2) set as the communication parameter, the data transmitted by the power receiving device 40 so as to receive the data.

Related art contactless power transmission systems are only on the assumption that a single power transmission device corresponds to a single power receiving device. The related art systems, thus, cannot realize a multi-power corresponding system that can corresponds with a plurality kinds of power receiving devices having different power specifications.

In contrast, in the embodiment, a communication condition is set by exchanging information between the power transmission side and the power receiving side. The information communication between the power transmission side and the power receiving side are performed by using the set communication condition. Accordingly, a plurality kinds of power receiving devices having different power specifications can be used. As a result, (the multi-power corresponding system) a power transmission system can be achieved that corresponds with multiple power specifications.

For example, the power receiving device 40 is designed for contactless power transmission with 0.5 watts, the power receiving device 40 (storing section 53) has communication condition information most suitable for the power transmission of 0.5 watts. Therefore, the communication under the optimum communication condition for the contactless power transmission of 0.5 watts can be performed by the following manner. The power transmission side receives the communication information from the power receiving device 40, and performs a communication processing by setting a communication condition based on the received communication condition information. As a result, quality and reliability of the communication can be improved.

As another example, the power receiving device 40 is designed for contactless power transmission with 15 watts, the power receiving device 40 has communication condition information most suitable for the power transmission of 15 watts. Therefore, the communication under the optimum communication condition for the contactless power transmission of 15 watts can be performed by the following manner. The power transmission side receives the communication information from the power receiving device 40, and performs a communication processing by setting a communication condition based on the received communication condition information. As described above, the power transmission side can correspond with both the ones of 0.5 watts and 15 watts. The general versatility can be improved, enabling a power transmission system corresponding with multiple power specifications to be achieved.

The communication processing sections 36 and 66 perform communication processings (e.g., a communication processing during a charging period) after the start of normal power transmission between the power transmission device 10 and the power receiving device 40 by using communication conditions set by the communication condition setting sections 34 and 64 respectively. Specifically, the communication processing sections 36 and 66 perform a communication processing between the power transmission device 10 and the power receiving device 40 by using an initial communication condition (a default condition) before the start of normal power transmission. That is, the communication processing is performed by using at least one of an initial communication method and an initial communication parameter that are set as the initial communication condition.

The communication condition setting section 34, on the power transmission side, exchanges information with the power receiving device 40 in the communication processing using the initial communication condition before the start of normal power transmission, thereby setting the communication condition used in a communication processing after the start of normal power transmission. For example, the communication condition setting section 34 receives communication condition information (e.g., a setup frame, which is described later) from the power receiving device 40 so as to set the communication condition after the start of normal power transmission.

On the other hand, the communication condition setting section 64, on the power receiving side, exchanges information with the power transmission device 10 in the communication processing using the initial communication condition before the start of normal power transmission, thereby setting the communication condition used in a communication processing after the start of normal power transmission. For example, the communication condition setting section 64 transmits communication condition information (e.g., the setup frame, which is described later) to the power transmission device 10 so as to set the communication condition after the start of normal power transmission.

In this way, information is exchanged in communication under the initial communication condition before the start of normal power transmission so as to set communication condition after the start of normal power transmission, whereby communication after the start of normal power transmission can be performed by using the communication condition. Therefore, communication can be performed with an optimum communication condition in accordance with each of the period before the start of normal power transmission and the period after the start of normal power transmission. As a result, quality of communication can be improved. For example, before the start of normal power transmission, information (negotiation information, set up information) communication may be performed while the temporary power transmission is performed at low power under the initial communication condition. After the start of normal power transmission, information communication may be performed while power is transmitted at levels corresponding to the plurality kinds of the power receiving devices having different power specifications. In this case, setting different communication conditions between the temporary power transmission period before the start of normal power transmission and the normal power transmission period allows communication errors and EMI noises to be reduced. As a result, quality of communication can be improved.

In addition to the communication parameters, the communication method may also differ before and after the start of normal power transmission. In other words, communication is performed by a first communication method before the start of normal power transmission while communication is performed by a second communication method after the start of normal power transmission. For example, information communication is performed by a communication method using the RF-ID tag before the start of normal power transmission while communication is performed by another communication method using load modulation or frequency modulation after the start of normal power transmission. Further, an amplitude detection method (a peak detection method) is used as a detection method of the load modulation before the start of normal power transmission while a pulse width detection method (a phase detection method) is used as another detection method of the load modulation after the start of normal power transmission. With the communication methods different before and after the start of normal power transmission, communication can be performed, by an optimum communication method in each period of before and after the start of normal power transmission, also in a power transmission system corresponding with multiple power specifications.

In the embodiment, the controller 22, on the power transmission side, includes a negotiation processing section 37, a setup processing section 38, and a command processing section 39. Likewise, the controller 52, on the power receiving side, includes a negotiation processing section 67, a setup processing section 68, and a command processing section 69. The command processing sections 39 and 69 may not be included in the power transmission device and the power receiving device.

The negotiation processing sections 37 and 67 perform a negotiation processing of contactless power transmission. That is, between the power transmission device and the power receiving device, information on basic settings of contactless power transmission (a standard, a coil, a system, a safety feature, and the like) is exchanged. The setup processing sections 38 and 68, based on a result of the negotiation processing, perform a setup processing of contactless power transmission. That is, after the basic setup of contactless power transmission is made in the negotiation processing, setup information different from each apparatus and application is exchanged between the power transmission side and the power receiving side. The command processing sections 39 and 69 perform a command processing of contactless power transmission after the setup processing. That is, a basic command and a command that becomes available in the setup processing are issued and executed. After the setup processing, the controller 22 may start normal power transmission without going through the command processing. For example, without an explicit command being issued, normal power transmission may start after the setup processing.

Specifically, the negotiation processing section 37, on the power transmission side, performs a confirmation processing that confirms whether or not information can be communicated with the power receiving device 40, a confirmation processing that confirms whether or not the communicated information is adequate, and a confirmation processing that confirms whether or not a load state on the power receiving device is appropriate. That is, in the negotiation processing, the following are confirmed: whether or not information can be appropriately received from the power receiving side, whether or not the received information received from the power receiving side is assumed appropriate information, and whether the power receiving side is not a foreign object but an appropriate power receiving device (a load). In this regard, a load state on the power receiving side may not be confirmed in the negotiation processing.

More specifically, the negotiation processing section 37 performs a collation processing that collates standard information, coil information, and system information with those of the power receiving device 40. The system information indicates a load state detection method. That is, the standard/coil/system information received from the power receiving side is collated with that of the power transmission side so as to confirm whether or not the information is compatible (matched).

The setup processing section 38, based on a result of the negotiation processing, sets a transmission condition of contactless power transmission as well as communication conditions.

Specifically, when the power receiving device 40 transmits transmission condition information of contactless power transmission, the setup processing section 38 receives the transmission condition information so as to set the transmission condition of the contactless power transmission. That is, when the power receiving device 40 transmits transmission condition information, such as a driving voltage as well as a driving frequency of a coil, required for normal power transmission, based on the transmission condition information, the setup processing section 38 sets a transmission condition such as the driving voltage and the driving frequency.

When the power receiving device 40 transmits communication condition information, the setup processing section 38 receives the communication condition information so as to set a communication condition. Specifically, the power receiving device 40 transmits communication condition information that designates a communication method, communication parameters (f2, SIGH2) and the like, the setup processing section 38 sets a communication condition based on the communication condition information. The setup processing section 38 also exchanges setup information different from each apparatus and application with the power receiving device 40.

After the setup processing, the command processing section 39 processings various commands such as a normal power transmission start command, a detection command on a full charge of the battery 94 (a full charge notifying command), a confirmation command on a recharge of the battery 94, and a communication command. That is, the command processing section 69 issues and executes these commands. As the commands, at least the normal power transmission start command is prepared. Other commands can be treated as optional commands.

The negotiation processing section 67, on the power receiving side, performs a confirmation processing that confirms whether or not information can be communicated with the power transmission device 10, and a confirmation processing that confirms whether or not the communicated information is adequate. Specifically, the negotiation processing section 67 performs a collation processing that collates standard information, coil information, and system information that indicates a load state detection method. That is, the negotiation processing section 67 transmits standard/coil/system information to the power transmission side, and receives that from the power transmission side so as to confirm whether or not both the information are compatible (matched).

The setup processing section 68, based on a result of the negotiation processing, transmits transmission condition information of contactless power transmission and communication condition information to the power transmission device 10. That is, transmission condition information such as the driving voltage and the driving frequency of the coil required for normal power transmission is transmitted. In addition, communication condition information such as the communication method and the communication parameter is transmitted. Further, different setup information for each apparatus and application is exchanged with the power transmission device 10.

After the setup processing, the command processing section 69 performs various command processings such as the normal power transmission start command, the detection command on a full charge of the battery 94, the confirmation command on a recharge of the battery 94, and the communication command. That is, the command processing section 69 issues and executes these commands. After the setup processing, if the normal power transmission from the power transmission device 10 to the power receiving device 40 starts, the controller 52 may start a power supply to the load 90 without going through the command processing. For example, without an explicit command being issued, the power supply to the load 90 may start after the setup processing 3. Operation Next, an operation of the embodiment will be described in detail with reference to FIGS. 3A to 5C.

Figure 3A:
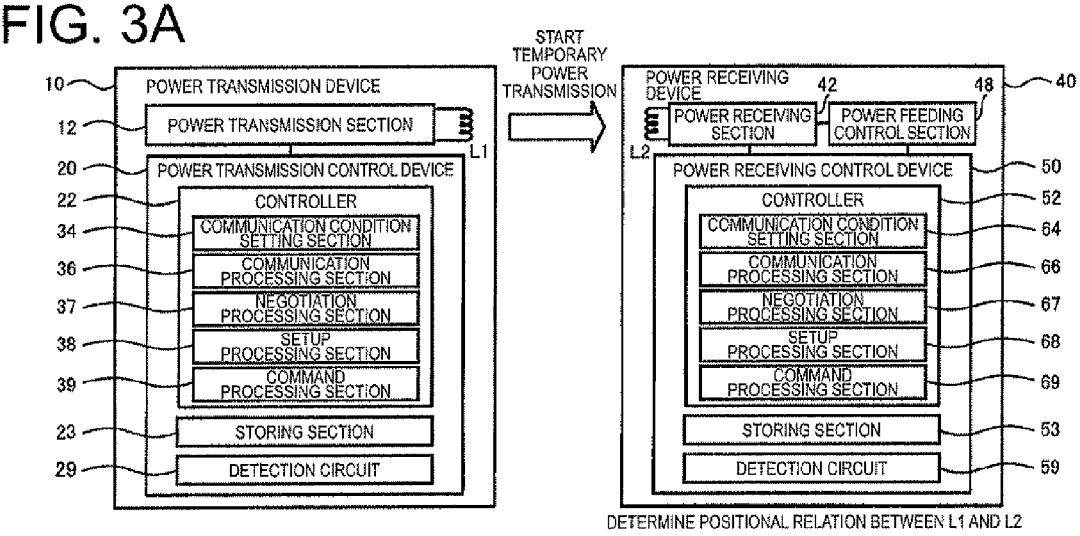
FIGS. 3A, 3B, and 3C are schematic views explaining the operation according to the embodiment.

As shown in FIG. 3A, first, the power transmission device 10 starts temporary power transmission (power transmission for detecting a position) before starting normal power transmission. With this temporary power transmission, a power supply voltage is supplied to the power receiving device 40, so that the power receiving device 40 is turned on. The temporary power transmission is performed, for example, by using a driving voltage (VF0 as the default of VF) and a driving frequency (f01 as the default of f1) already having been set in the storing section 23 as an initial transmission condition. The power receiving device 40, for example, determines whether or not a positional relation between the primary coil L1 and the secondary coil L2 is appropriate. Specifically, the power receiving device 40 determines whether or not the positional relation between the primary coil L1 and the secondary coil L2 is that is shown in FIG. 1B, for example.

Figure 3B:
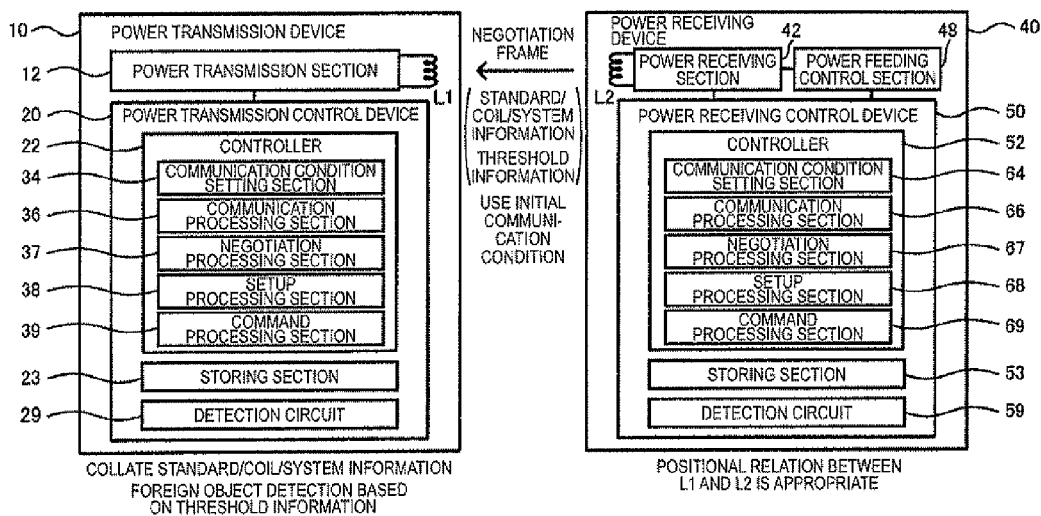

As shown in FIG. 3B, if the positional relation between the L1 and the L2 is determined to be appropriate, the power receiving device 40 (the negotiation processing section 67) makes a negotiation frame so as to transmit it to the power transmission device 10. The negotiation frame includes, for example, standard/coil/system information and threshold information. That is, the negotiation frame is made based on the standard/coil/system information and the threshold information stored in the storing section 53 on the power receiving side, and then is transmitted to the power transmission side. In this case, the negotiation frame communication is performed by using a communication method (e.g., frequency modulation, load modulation) and communication parameters (f02 as the default of f2, SIGH as the default of threshold for data detection) in the initial communication condition set as the default.

When receiving the negotiation frame from the power receiving device 40, the power transmission device 10 (the negotiation processing section 37) collates the standard/coil/system information on the power receiving side included in the received negotiation frame with that on the power transmission side stored in the storing section 23. That is, a confirmation processing is performed that confirms whether or not information can be communicated and whether or not the communicated information is adequate. Further, the threshold information received from the power receiving device 40 is set as threshold information for detecting a load state on the power receiving side. The power transmission device 10, based on the threshold information received from the power receiving device 40, detects whether or not a foreign object is inserted between the primary coil L1 and the secondary coil L2. That is, the power transmission device 10 confirms whether or not a load state of the power receiving side is appropriate.

Figure 3C:
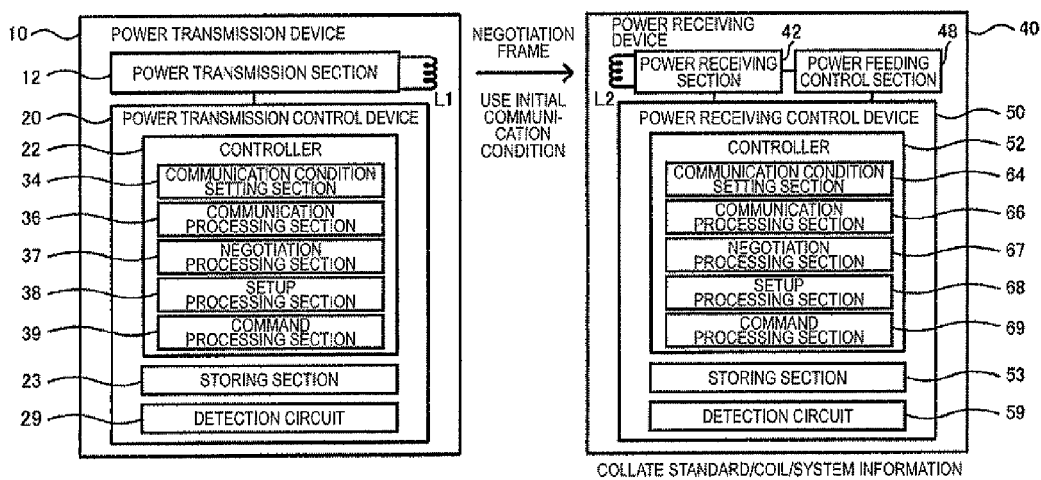

Then, as shown in FIG. 3C, if it is determined that the standard/coil/system information is compatible (matched), and no foreign object is detected, the power transmission device 10 makes a negotiation frame including the standard/coil/system information on the power transmission side so as to transmit it to the power receiving device 40. That is, the negotiation frame is made based on the standard/coil/system information stored in the storing section 23 on the power transmission side, and then is transmitted to the power receiving side. The negotiation frame communication, in this case, is performed by using the communication method and the communication parameter in the initial communication condition.

Figure 4A:
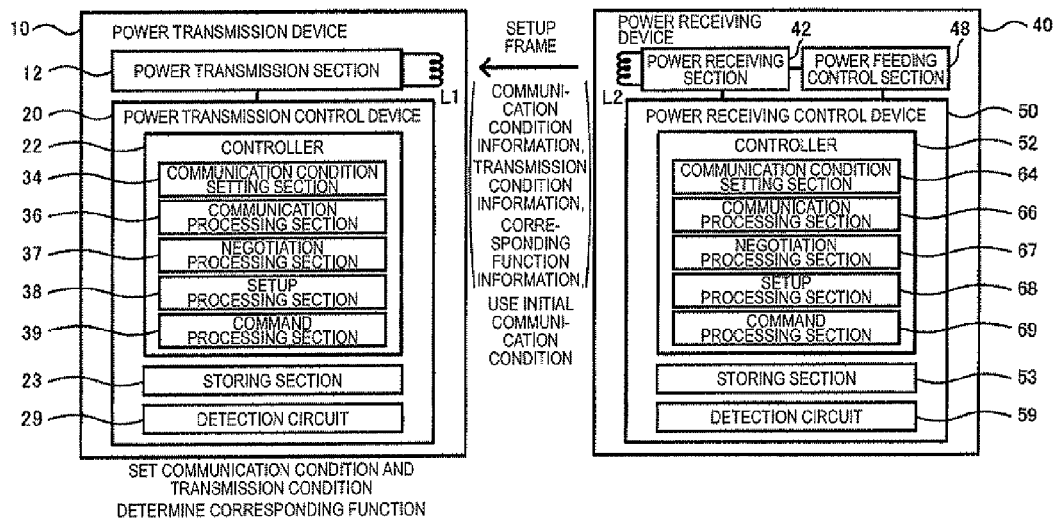
FIGS. 4A, 4B, and 4C are schematic views explaining the operation according to the embodiment.

The power receiving device 40 collates the standard/coil/system information on the power receiving side with that of the received negotiation frame. As shown in FIG. 4A, the power receiving device 40 (the setup processing section 68) makes a setup frame so as to transmit it to the power transmission device 10. Examples of the setup frame include communication condition information such as the communication method and the communication parameters (f2, SIGH2), transmission condition information such as the driving voltage (VF) and the driving frequency (f1) of the coil, and corresponding function information showing functions (commands and the like) that the power receiving side corresponds to. That is, the setup frame is made based on the communication condition information and the transmission condition information stored in the storing section 53 on the power receiving side, and then is transmitted to the power transmission side. The setup frame communication, in this case, is performed by using the communication method and the communication parameter in the initial communication condition.

When receiving the setup frame, the power transmission device 10 (the setup processing section 38) sets a communication condition and a transmission condition after the start of normal power transmission based on the communication information and the transmission condition information included in the setup frame. The power transmission device 10 also sets a use function (communication function, periodic authentication) based on the received corresponding function information on the power receiving side and corresponding function information on the power transmission side. Here, the corresponding function information on the power transmission side is stored in the storing section 23 on the power transmission side. That is, functions that both the power receiving side and the power transmission side can correspond to are set as the use function.

Figure 4B:
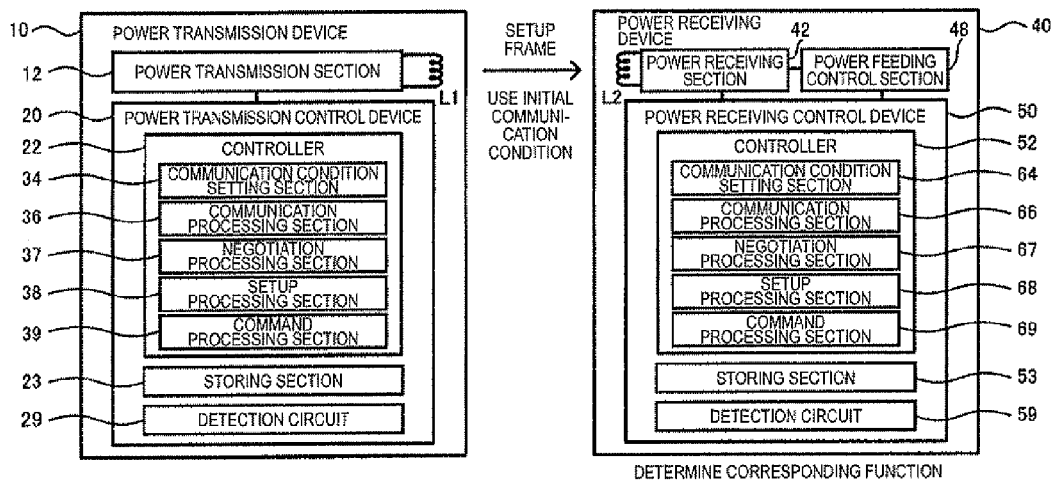

As shown in FIG. 4B, the power transmission device 10 makes a setup frame including corresponding function information on the power transmission side so as to transmit it to the power receiving device 40. The setup frame communication, in this case, is performed by using the communication method and the communication parameter in the initial communication condition. The power receiving side sets a use function based on the received corresponding function information on the power transmission side.

Figure 4C:
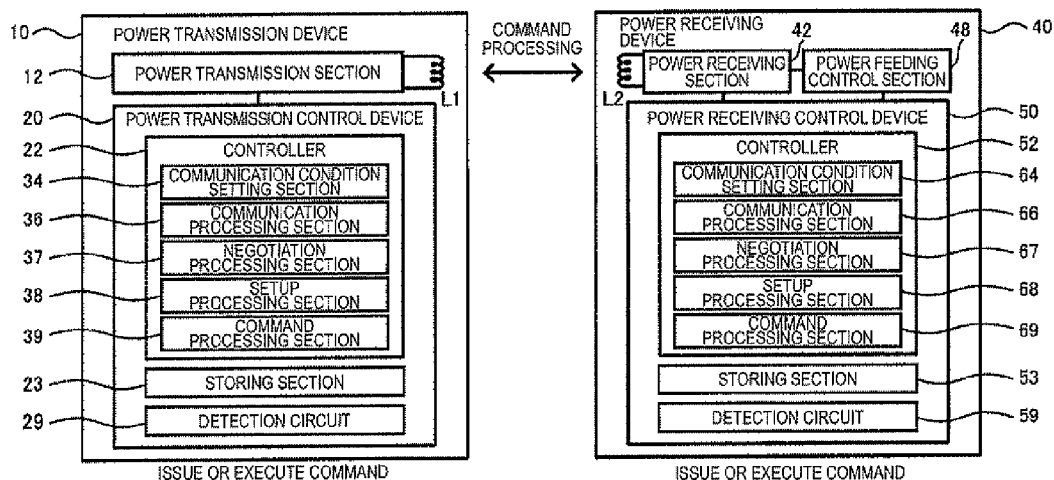

Next, as shown in FIG. 4C, based on a result of the setup processing, the command processing is performed. That is, the power transmission device 10 (the command processing section 39) and the power receiving device 40 (the command processing section 69) issue or execute a corresponding command.

For example, when normal power transmission (a charge) is performed, the power receiving device 40 transmits a start frame to the power transmission device 10. The power transmission device 10 issues the normal power transmission start command (a charge start command) so as to transmit it to the power receiving device 40. The power receiving device 40 transmits a response command for the normal power transmission start command to the power transmission device 10. In this way, the command processing on the normal power transmission by the power transmission device 10 and the power receiving device 40 is executed. In this case, the normal power transmission is performed by using the driving voltage (VF) and the driving frequency in the transmission condition set in the setup processing shown in FIG. 4A. As a result, a power transmission system can be realized that corresponds with multiple power specifications.

Figure 5A:
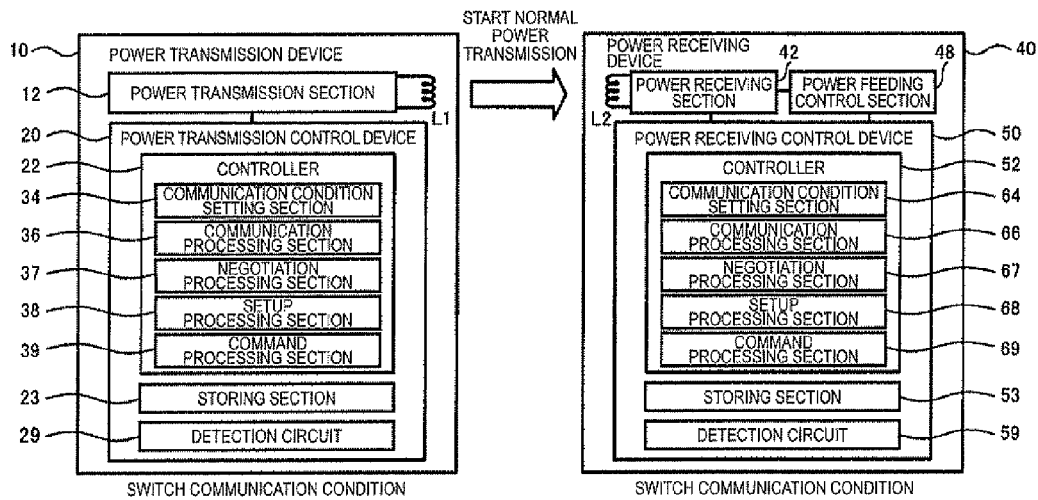
FIGS. 5A, 5B, and 5C are schematic views explaining the operation according to the embodiment.
Figure 5B:
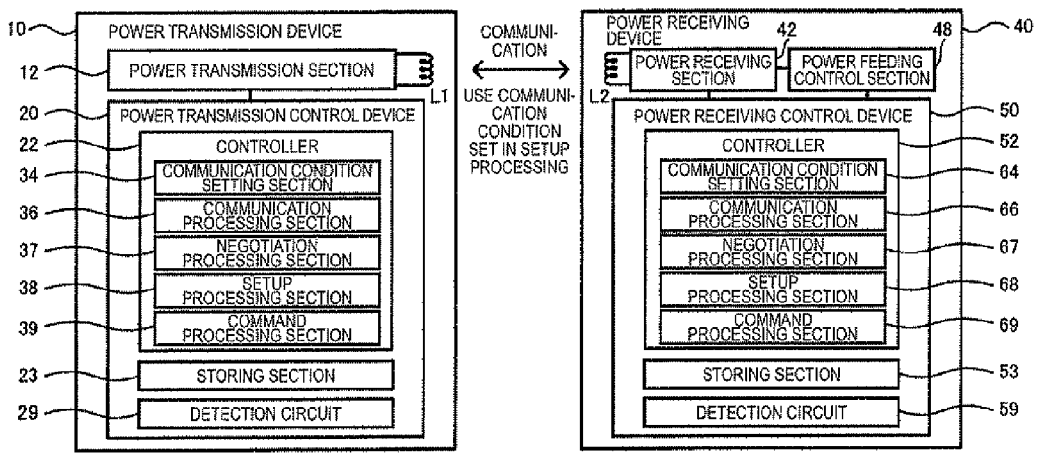

After the start of normal power transmission, the communication condition is switched to the communication condition set in the setup processing shown in FIG. 4A from the initial communication condition. That is, as shown in FIG. 5B, communication after the start of normal power transmission is performed by using the communication condition set in the setup processing.

Figure 5C:
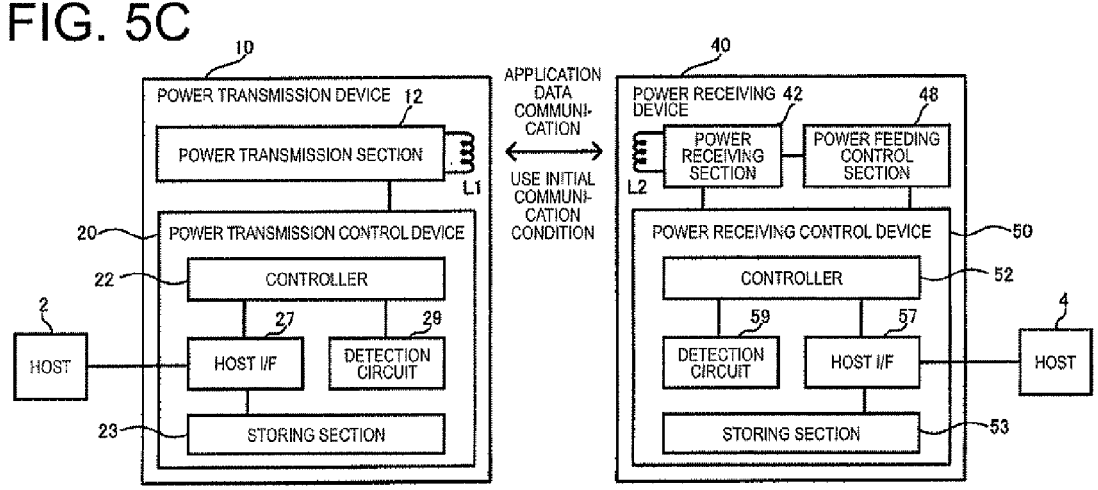

As shown in FIG. 5C, a host interface (I/F) 27 to communicate with a host 2 on the power transmission side may be provided in the power transmission control device 20 while a host I/F 57 to communicate with a host 4 on the power receiving side may be provided in the power receiving control device 50. The host 2 is a CPU and the like mounted in apparatuses (e.g., chargers) on the power transmission side. The host 4 is a CPU, an application processor, and the like mounted in apparatuses (e.g., cell phones, and mobile electronic apparatuses) on the power receiving side. The communication method between the host 2 and the I/F 27 as well as between the host 4 and the I/F 57 can be realized by an inter integrated circuit (I2C), for example. The communication method is not limited to the I2C, and communication methods based on similar ideas to the I2C, and communication methods for a typical serial interface and a parallel interface may be employed.

As shown in FIG. 5C, the host I/F 27 and the host I/F 25 are provided on the power transmission side and the power receiving side, enabling the communication between the host 2 on the power transmission side and the host 4 on the power receiving side to be performed. In related art contactless power transmission systems, only ID authentication information can be communicated between the power transmission side and the power receiving side. In contrast, the structure shown in FIG. 5C enables, for example, application data to be communicated between an apparatus on the power transmission side, such as a charger, and an apparatus on the power receiving side, such as a cell phone, by utilizing the contactless power transmission. Accordingly, data communication between the apparatuses can be performed by utilizing a charging period, for example. As a result, convenience of users can be significantly improved.

As shown in FIG. 5C, when an interruption request is sent from the host 2 or host 4 after the start of normal power transmission, the power transmission control device 20 or the power receiving control device 50 moves to a communication mode. Specifically, upon such communication interruption request being sent, the power feeding control section 48 stops a power supply to the load 90 (turn off a power supply transistor), and the power receiving control device 50 moves to the communication mode. In the communication mode, the hosts 2 and 4 communicate by any protocol. Thereafter, upon the host 2 issuing the normal power transmission start command, for example, the mode is reversed to the normal power transmission mode (a charging mode) from the communication mode.

In the communication mode, if upper application data is communicated between the hosts 2 and 4, the communication condition may be set to the initial communication condition (a communication condition in the temporary power transmission period before the start of normal power transmission), for example. The transmission condition of contactless power transmission may be set to the initial transmission condition. In other words, it is preferable that commands (e.g., communication interruption request, full charge detection, and recharge confirmation commands) be transmitted by using the communication condition and the transmission condition that are set in the setup processing since the commands are transmitted during the normal power transmission period. On the other hand, in the communication mode in which application data is communicated, the default communication condition and the default transmission condition are used to enable more safety and reliable communication to be performed since the power supply to the load 90 can be stopped in the communication mode, whereby the communication condition and the transmission condition that are set in the setup processing are not necessarily used. That is, in the communication mode, the communication condition and the transmission condition in the temporary power transmission period is used. In the temporary power transmission period, a priority is given to the reliability of the communication than the transmission efficiency of the power transmission. For example, the driving frequency and the driving voltage are set to a lower level. As a result, for example, data transmission errors can be reduced, whereby the liability of the communication can be improved.

4. Processing Sequence of Contactless Power Transmission

As contactless power transmission is widely used, it is expected that various types of secondary coils for the power receiving side are available in markets. That is, since electric apparatuses, such as cell phones, serving as the power receiving side have a wide variety of shapes and sizes, secondary coils installed in the power receiving devices of the electric apparatuses also have a wide variety of shapes and sizes. In addition, electronic apparatuses need a wide variety of electrical energy (wattages) and output voltages for contactless power transmission. As a result, the secondary coils also have a wide variety of inductances and the like.

On the other hand, in contactless power transmission, power can be transmitted even if the shapes and the sizes of the primary coil and the secondary coil are not completely compatible. In this regard, in a charge using a wired cable, such case can be prevented by devising a shape and the like of cable connectors. However, in contactless power transmission, such device is hard to be made.

Currently, each supplier employs an individual method to realize contactless power transmission.

However, in order to encourage broad use of contactless power transmission as well as ensure the safety in the use, it is preferable to realize a processing sequence of contactless power transmission with high general versatility.

Figure 6:
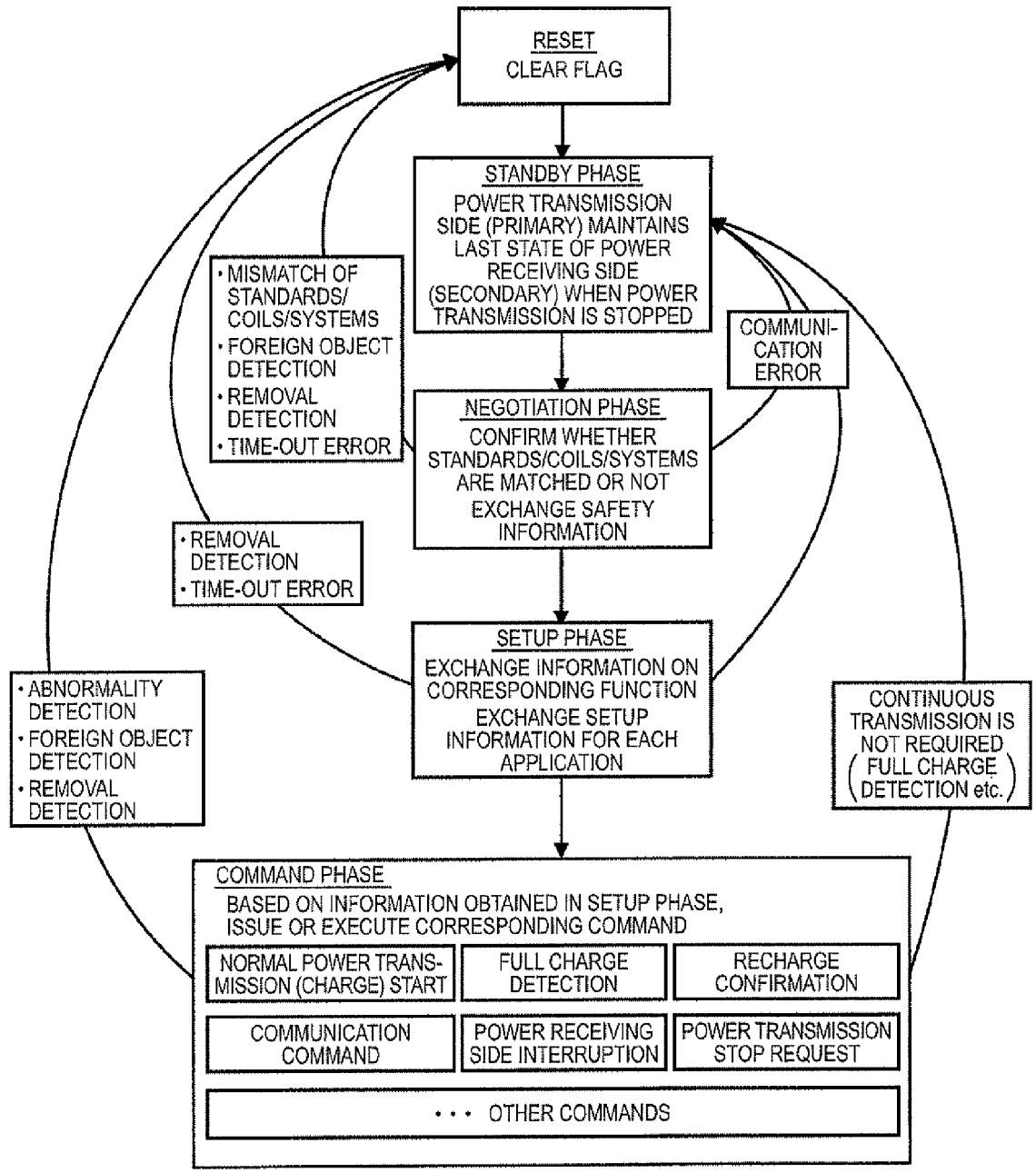
FIG. 6 is a schematic view explaining a processing sequence of the contactless power transmission of the embodiment.

FIG. 6 schematically shows a processing sequence of contactless power transmission realized by the embodiment.

In the processing sequence, the sequence moves to a standby phase after a reset state. In the reset state, various flags maintained on the power transmission side (the primary side) and the power receiving side (the secondary side) are cleared. Here, the flags represent conditions of the power transmission device and the power receiving device (a power transmission state, a full charge state, a recharge confirmation state, and the like), and kept in the register section of the devices.

In the standby phase, the power transmission side (the primary side) maintains the last state of the power receiving side (the secondary side) at the time of stoppage (at the time at which power transmission is stopped). For example, if a full charge of the battery is detected, the power transmission side and the power receiving side move to the standby phase after the detection of the full charge. In this case, since the battery needs to be recharged by detecting a battery voltage drop, the power transmission side stores that the power transmission stop is due to the full charge detection. Specifically, a recharge confirmation flag is maintained in a set state without clearing it so as to periodically confirm whether or not a recharge is required.

In the standby phase, power transmission from the power transmission side to the power receiving side is stopped. As a result, a power supply voltage is not supplied to the power receiving side, so that the power receiving side is in a stop state. On the other hand, a power supply voltage is supplied to the power transmission side, so that the power transmission side is in an operating state. As described above, the power receiving side stops the operation in the standby phase, thereby achieving low power consumption. At this time, the power transmission side maintains flags for various states without clearing them, so that the power transmission side can perform various processings by using the flags after the standby phase The power transmission side and the power receiving side move to a negotiation phase after the standby phase. In the negotiation phase, a negotiation processing is performed in which a match of standard/coil/system is confirmed and safety information is exchanged. Specifically, the power transmission side and the power receiving side exchange standard/coil/system information so as to confirm whether or not the information is compatible. In addition, for example, safety threshold information for detecting foreign objects and the like is transmitted from the power receiving side to the power transmission side so as to exchange safety information. In the negotiation processing, the following are confirmed: whether or not information can be communicated between the power transmission side and the power receiving side; whether or not the communicated information is adequate; whether or not a load state on the power receiving side is appropriate (undetection of foreign objects); and the like.

The sequence moves to the reset state, and the various flags are cleared, if any of the following cases occur in the negotiation processing: a mismatch of standard/coil/system is determined; a foreign object is detected; a removal of the apparatus is detected; and a time-out error occurs. On the other hand, if a communication error occurs, the sequence moves to the standby phase, for example, and the flags are not cleared.

The power transmission side and the power receiving side move to a setup phase after the negotiation phase. In the setup phase, a setup processing is performed in which setup information such as corresponding function information and setup information for each application is transferred. For example, based on a result of the negotiation processing, a transmission condition of contactless power transmission is set. Specifically, if the power receiving side transmits transmission condition information such as a driving voltage as well as a driving frequency of a coil to the power transmission side, the power transmission side sets a transmission condition such as the driving voltage and the driving frequency of the coil for normal power transmission based on the received transmission condition information. In addition, information on corresponding functions and setup information different in different upper applications are also exchanged in the setup processing. Specifically, the following information is exchanged in the setup processing: threshold information (e.g., threshold information for data communication and foreign object detection) for detecting a load state on the power receiving side after the start of normal power transmission; kinds of commands that the power transmission side and the power receiving side are able to issue or execute in the command phase; and additional corresponding functions such as a communication function and a periodic authentication function. Accordingly, setup information can be exchanged that is different in different applications such as kinds (a cell phone, audio equipment, and the like) and models of electric apparatuses.

In the setup processing, the sequence moves to the reset state if a removal of the apparatus is detected or a time-out error occurs. On the other hand, if a communication error and the like occur, the sequence moves to the standby phase.

The power transmission side and the power receiving side move to the command phase after the setup phase. In the command phase, a command processing is performed based on the information obtained in the setup processing. That is, a corresponding command (confirmed that it can correspond, in the setup processing) is issued or executed. Examples of the command executed in the command processing include: a normal power transmission (a charge) start command, a full charge detection (notifying) command, a recharge conformation command, a communication command, a power receiving side interruption command, and a power transmission stop request command.

For example, when normal power transmission is ready after the negotiation processing and the setup processing, the power transmission side transmits (issues) the normal power transmission (a charge) start command to the power receiving side. Then, the power receiving side receives the command and transmits a response command to the power transmission side so as to start the normal power transmission. If a full charge is detected on the power receiving side after the start of normal power transmission, the power receiving side transmits the full charge detection command to the power transmission side.

If continuous power transmission is not required as the full charge is detected, the sequence moves to the standby phase after the detection of the full charge. After going through the negotiation processing and the setup processing again, the power transmission side transmits the recharge confirmation command to the power receiving side. When receiving the command, the power receiving side checks a battery voltage so as to determine whether or not a recharge is required. If a recharge is required, the recharge confirmation flag is reset. The power transmission side issues the normal power transmission start command so as to restart the normal power transmission. On the other hand, if a recharge is not required, the recharge confirmation flag is maintained in the set state. Then, the sequence returns to the standby phase after the detection of the full charge.

If any abnormality, a foreign object, or a removal is detected in the command processing, the sequence moves to the reset state.

Figure 7:
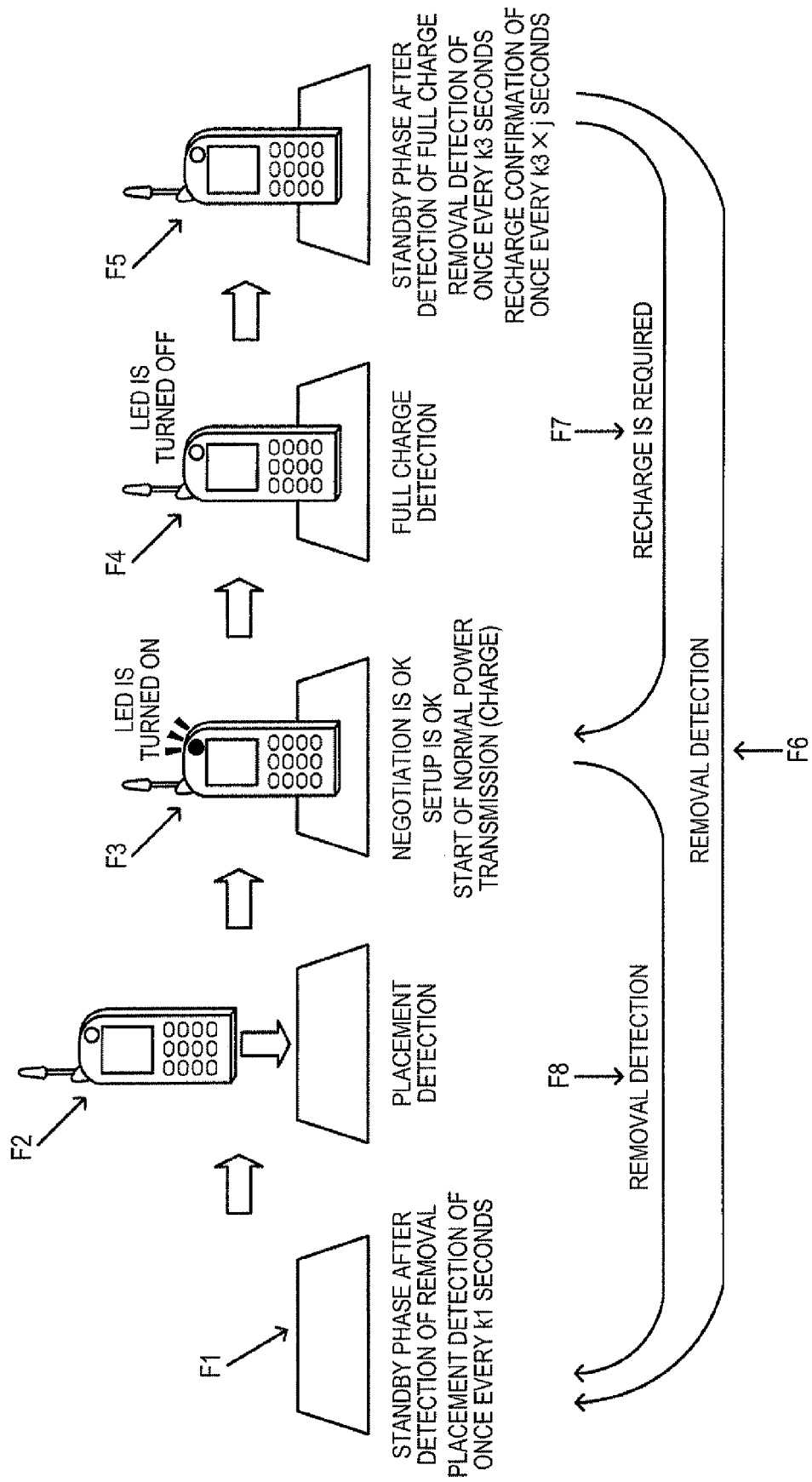
FIG. 7 is a schematic view explaining a processing sequence of the contactless power transmission of the embodiment.

The processing sequence according to the embodiment is more specifically described with reference to FIG. 7. In the standby phase after the detection of the removal shown in F1, placement detection is performed once every k1 second, for example. As shown in F2, if a placement (an installation) of the electronic apparatus is detected, the negotiation processing and the setup processing are performed. As shown in F3, if the negotiation processing and the setup processing are normally ended, and the normal power transmission start command is issued in the command processing, the normal power transmission starts so as to start charging the electronic apparatus. As shown in F4, if a full charge is detected, an LED of the electronic apparatus is turned off. Then, the processing sequence moves to the standby phase after the detection of the full charge as shown in F5.

In the standby phase after the detection of the full charge, removal detection is performed once every k3 seconds and a recharge is confirmed once every k3×j seconds. Then, in the standby phase after the detection of the full charge, if a removal of the electronic apparatus is detected as shown in F6, the processing sequence moves to the standby phase after the detection of the removal. On the other hand, in the standby phase after the detection of the full charge, if it is determined that a recharge is required by the recharge confirmation as shown in F7, the negotiation processing and the setup processing are performed. Then, the normal power transmission is restarted so as to start recharging the battery. If a removal of the electric apparatus is detected during the normal power transmission as shown in F8, the processing sequence moves to the standby phase after the detection of the removal.

The system information transferred in the negotiation phase shows methods for detecting load state on the power transmission side and the power receiving side. Examples of the method for detecting the load state include the pulse width detection method (the phase detection method), the current detection method, the peak voltage detection method, and the combination thereof. The system information shows either one method employed out of the methods by the power transmission side and the power receiving side.

The foreign object threshold is safety threshold information. The foreign object threshold is, for example, stored in the power receiving side, and is transmitted from the power receiving side to the power transmission side before the start of normal power transmission. The power transmission side, based on the foreign object threshold, performs first foreign object detection that is foreign object detection before the start of normal power transmission. For example, if a load state on the power receiving side is detected by the pulse width detection method, a threshold of a pulse width count value is transmitted from the power receiving side to the power transmission side as a foreign object threshold. Based on the threshold of the pulse width count value, the power transmission side performs the first foreign object detection by the pulse width detection method. In this way, in the embodiment, the threshold information for detecting a load state on the power receiving side before the start of normal power transmission is transmitted to the power transmission side from the power receiving side in the negotiation processing. On the other hand, the threshold information for detecting a load state on the power receiving side after the start of normal power transmission is, for example, transmitted to the power transmission side from the power receiving side in the setup processing.

Figure 8:
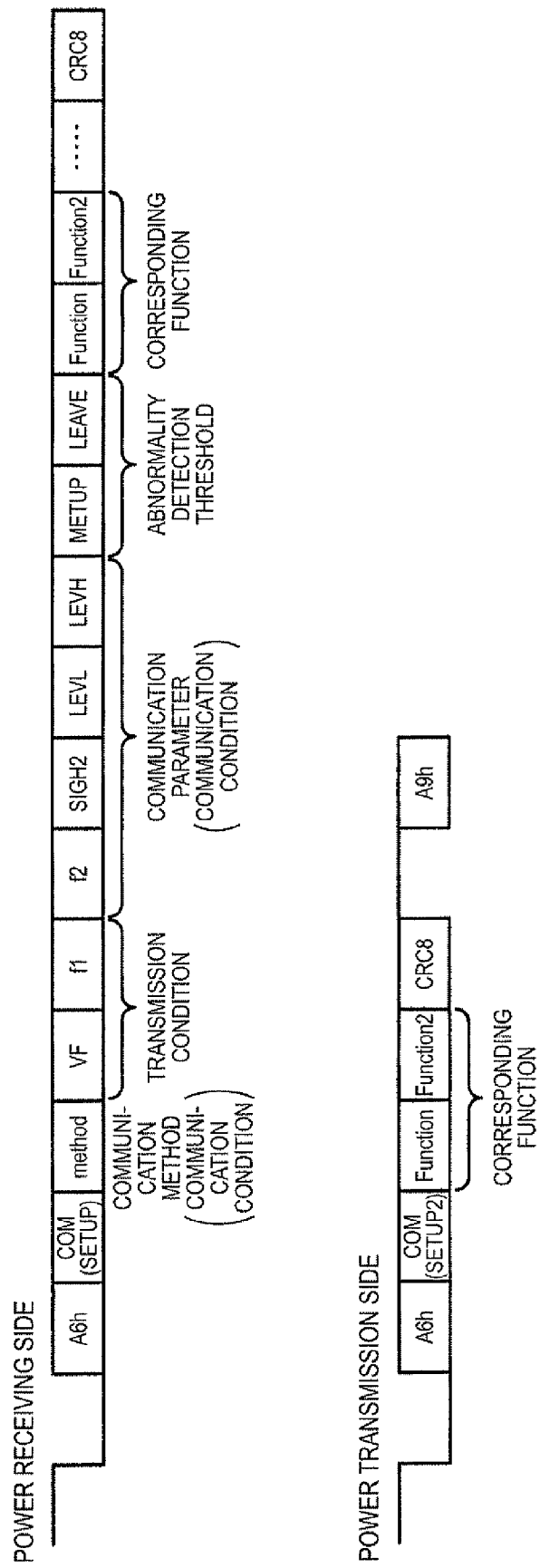
FIG. 8 is an example of a setup frame.

FIG. 8 shows an example of the setup frame transferred in the setup processing. As shown in FIG. 8, in the setup frame transmitted from the power receiving side, information on a communication method (method), transmission conditions (VF, f1), communication parameters (f2, SIGH2, LEVL, LEVH) are set after a command indicating a setup. In addition, information on abnormality detection thresholds (METUP, LEAVE), such as overload detection and removal detection, and corresponding functions (Function, Function2) on the power receiving side are set. In the setup frame transmitted from the power transmission side, information on the corresponding functions (Function, Function2) on the power transmission side are set after the command indicating a setup.

According to the processing sequence of the embodiment, the compatibility of standard/coil/system is determined and the minimum safety information is exchanged in the negotiation processing. Further, in the negotiation processing, the possibility of communication and the adequacy of the communication information are determined as well as the propriety of a load state of the power receiving device is determined.

In the setup processing, a transmission condition required for the normal power transmission is set. For example, the driving voltage and the driving frequency of the coil are set. In addition, threshold information for detecting a load state after the start of normal power transmission is transferred, and information on an additional corresponding function and setup information required for each upper application are exchanged in the setup processing.

After going through the setup processing and the negotiation processing, the processing sequence moves to the command phase so as to perform the command processing. That is, a command confirmed that it can correspond in the negotiation processing is issued or executed in the command processing.

Accordingly, the minimum information required for securing the compatibility and the safety of the system is exchanged in the negotiation processing, and setup information different in different applications is exchanged in the setup processing. As a result, if information on the power transmission side is not compatible with that of the power receiving side, it is excluded in the negotiation processing, whereby the setup information having a large volume of information is not transferred. In the negotiation processing, only the minimum information is transferred, whereby an amount of transferred information can be reduced. Thus, the negotiation phase is ended in a short time, allowing achieving an efficient processing.

Each apparatus on the power transmission side and the power receiving side can perform minimum contactless power transmission by the negotiation processing, and each apparatus can expand the functions by exchanging the setup information. Each apparatus makes the minimum setting required for a contactless power transmission system in the negotiation processing, and the system can be optimized in the setup processing. As a result, a flexible system can be realized.

The power transmission side receives threshold information and system information from the power receiving side, and can realize contactless power transmission and foreign object detection only by setting the received threshold information and the system information. Therefore, the processings on the power transmission side can be simplified. In this case, the power receiving side transmits coil information of an appropriate combination and threshold information to the power transmission side, so that appropriate and safe contactless power transmission can be realized.

5. Specific Structural Example

Figure 9:
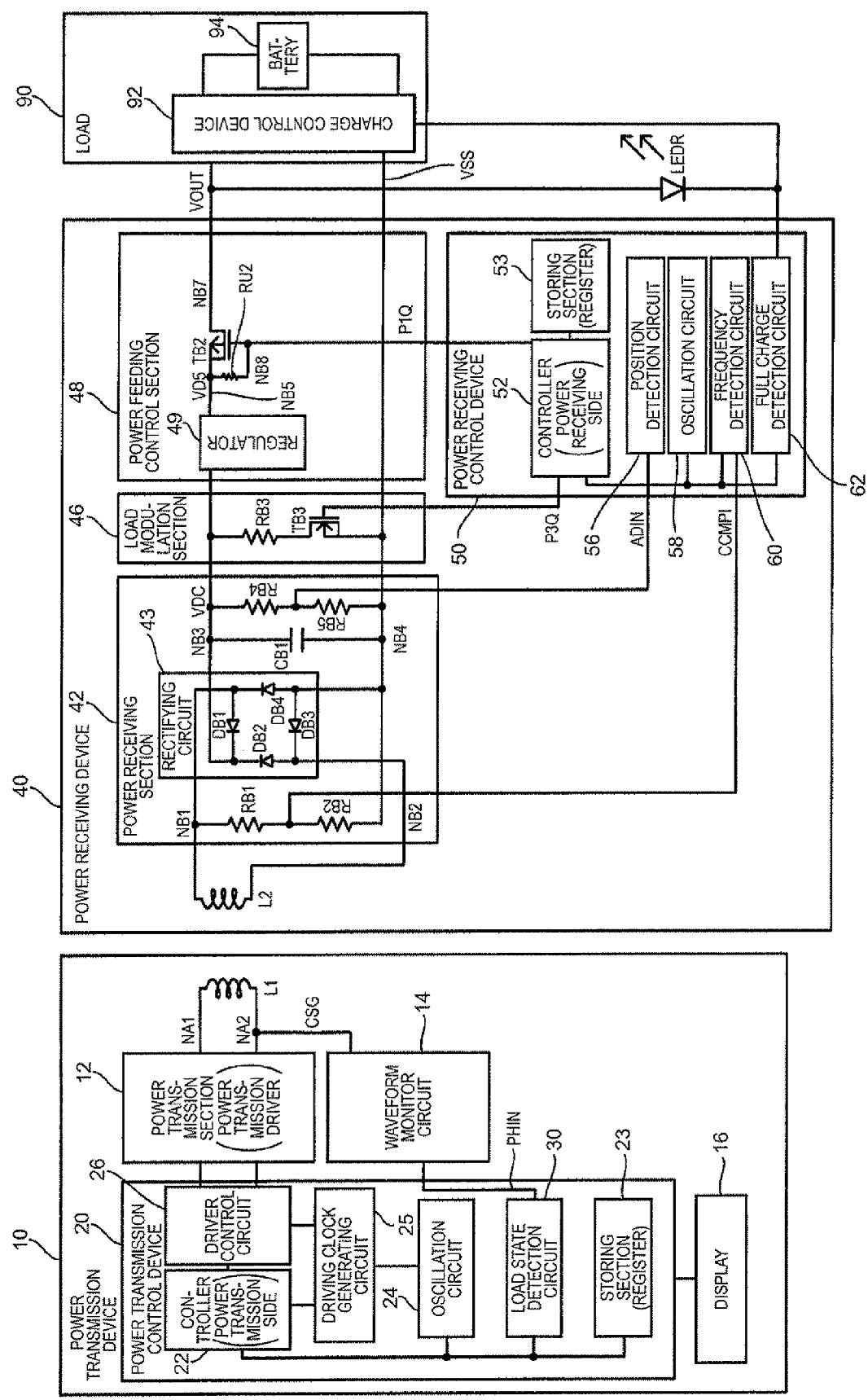
FIG. 9 is a specific structural example of the power transmission device, the power transmission control device, the power receiving device, and the power receiving control device according to the embodiment.

A detailed structural example of the embodiment is shown in FIG. 9. Hereinafter, the elements described in FIG. 2 are indicated by the same numerals and the description thereof is omitted.

A waveform monitor circuit 14, based on a coil terminal signal CGS of the primary coil L1, generates an induced voltage signal PHIN for a waveform monitor. For example, the coil terminal signal CGS that is an induced voltage signal of the primary coil L1 may exceed a maximum rating voltage of an IC of the power transmission control device 20 or have a negative voltage. The waveform monitor circuit 14 receives the coil terminal signal CGS so as to generate the induced voltage signal PHIN for a waveform monitor and outputs it to, for example, a terminal for a waveform monitor of the power transmission control device 20. The induced voltage signal PHIN is capable of being detected as a waveform by the load state detection circuit 30 of the power transmission control device 20. A display 16 displays various states of the contactless power transmission system (in power transmitting, ID authenticating, and the like) with colors, images, and the like.

An oscillation circuit 24 generates a clock for the primary side. A driving clock generating circuit 25 generates a driving clock defining the driving frequency. A driver control circuit 26, based on the driving clock from the driving clock generating circuit 25 and a frequency set signal from the controller 22, generates a control signal having a desired frequency. Then, the control signal is outputted to first and second power transmission drivers of the power transmission section 12 so as to control the first and the second power transmission drivers.

The load state detection circuit 30 shapes a waveform of the induced voltage signal PHIN so as to generate a waveform shaping signal. For example, the load state detection circuit 30 generates a waveform shaping signal (a pulse signal) of a square wave (a rectangular wave). The square waveform becomes active (e.g., an H level) if the signal PHIN is beyond a given threshold voltage. The load state detection circuit 30, based on the waveform shaping signal and the driving clock, detects pulse width information (a pulse width period) of the waveform shaping signal. Specifically, the load state detection circuit 30 receives the waveform shaping signal and the driving clock from the driving clock generating circuit 25 so as to detect the pulse width information of the waveform shaping signal. As a result, the pulse width information of the induced voltage signal PHIN is detected.

As for the load state detection circuit 30, the detection method is not limited to the pulse width detection method (phase detection method). Various methods such as the current detection method and the peak voltage detection method can be employed.

The controller 22 (the power transmission control device), based on a detection result in the load state detection circuit 30, determines a load state (load fluctuation, a degree of the load) of the power receiving side (the secondary side). For example, the controller 22, based on the pulse width information detected in the load state detection circuit 30 (a pulse width detection circuit), determines a load state on the power receiving side so as to detect, for example, data (a load), a foreign object (metal), a removal (placement and removal), and the like. That is, a pulse width period that is pulse width information of the induced voltage signal varies in accordance with the variation in a load state on the power receiving side. The controller 22 can detect load fluctuation on the power receiving side based on the pulse width period (a count value obtained by measuring the pulse width period).

The power receiving section 42 converts an alternating-current induced voltage of the secondary coil L2 into a direct-current voltage. The conversion is performed by a rectifying circuit 43 included in the power receiving section 42.

The load modulation section 46 performs a load modulation processing. Specifically, when desired data is transmitted from the power receiving device 40 to the power transmission device 10, a load on the load modulation section 46 (the secondary side) is variably changed so as to vary a signal waveform of the induced voltage of the primary coil L1. Therefore, the load modulation section 46 includes a resistance RB3 and a transistor TB3 (an N-type CMOS transistor) that are provided in series between nodes NB3 and NB4. The transistor TB3 is on/off-controlled by a signal P3Q from the controller 52 of the power receiving control device 50. When the transistor TB3 is on/off-controlled so as to perform a load modulation, a transistor TB2 of the power feeding control section 48 is turned off. As a result, the load 90 is in a state of not being electrically coupled to the power receiving device 40.

The power feeding control section 48 controls power feeding to the load 90. A regulator 49 regulates a voltage level of a direct-current voltage VDC obtained by the conversion in the rectifying circuit 43 so as to generate a power supply voltage VD5 (e.g., 5V). The power receiving control device 50 operates with a supply of the power supply voltage VD5, for example.

The transistor TB2 (a P-type CMOS transistor, a power feeding transistor) is controlled by a signal P1Q from the controller 52 of the power receiving control device 50. Specifically, the transistor TB2 is turned off during the negotiation processing and the setup processing while turned on after the start of normal power transmission.

A position detection circuit 56 determines whether or not a positional relation between the primary coil L1 and the secondary coil L2 is appropriate. An oscillation circuit 58 generates a clock for the secondary side. A frequency detection circuit 60 detects frequencies (f1, f2) of a signal CCMPI. A full charge detection circuit 62 detects whether or not the battery 94 (a secondary battery) of the load 90 is in a full charge state (a charged state).

The load 90 may include a charge control device 92 controlling a charge and the like of the battery 94. The charge control device 92 (a charge control IC) can be realized by an integrated circuit device and the like. As a smart battery, the battery 94 itself may have a function of the charge control device 92.

In FIG. 9, data communication from the power transmission side to the power receiving side is realized by a frequency modulation while data communication from the power receiving side to the power transmission side is realized by a load modulation.

Figure 10A:
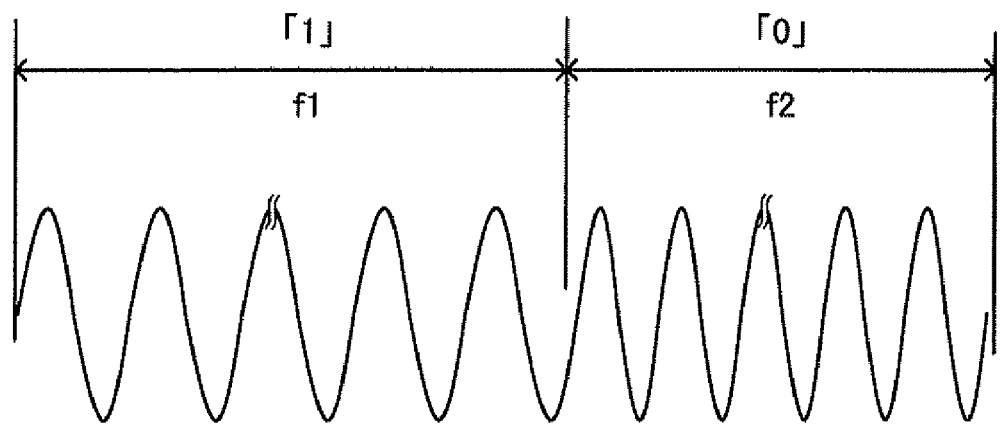
FIGS. 10A and 10B are explanatory views of data transmission by a frequency modulation and a load modulation.

Specifically, as shown in FIG. 10A, for example, when data "1" is transmitted to the power receiving side, the power transmission section 12 generates an alternating-current voltage having a frequency f1. On the other hand, when data "0" is transmitted, the power transmission section 12 generates an alternating-current voltage having a frequency f2. Then, the frequency detection circuit 60, on the power receiving side, detects the frequency change so as to determine data "1" or "0." As a result, data communication by the frequency modulation from the power transmission side to the power receiving side can be realized.

Figure 10B:
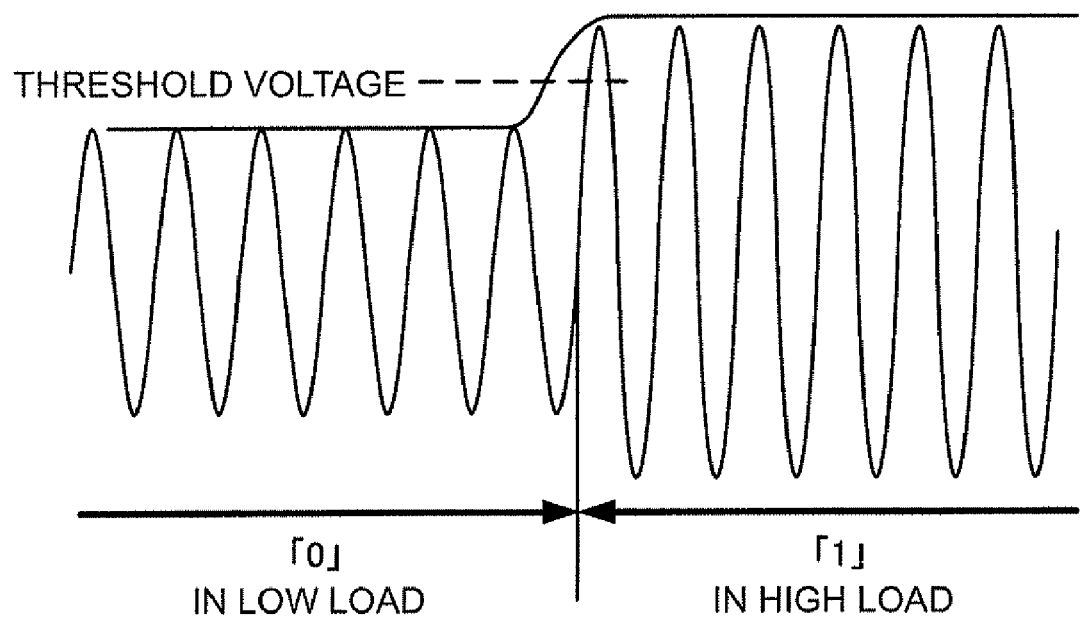

On the other hand, the load modulation section 46, on the power receiving side, variably changes a load of the power receiving side in accordance with data to be transmitted. That is, as shown in FIG. 10B, a signal waveform of the induced voltage of the primary coil L1 is varied. For example, when data "1" is transmitted to the power transmission side, the power receiving side is in a high load state. On the other hand, when data "0" is transmitted, the power receiving side is in a low load state. Then, a load state detection circuit 30, on the power transmission side, detects the load state change on the power receiving side so as to determine data "1" or "0." As a result, data communication by the load modulation from the power receiving side to the power transmission side can be realized.

In FIGS. 10A and 10B, data communication from the power transmission side to the power receiving side is realized by the frequency modulation while data communication from the power receiving side to the power transmission side is realized by the load modulation. However, another modulation method or other methods may be employed.

6. Specific Operational Example

Next, operations on the power transmission side and the power receiving side will be described in detail with reference to flowcharts shown in FIGS. 11 and 12.

Upon being turned on, the power transmission side performs temporary power transmission before the start of normal power transmission (step S2), for example, after a wait of a k1 second (step S1). The temporary power transmission is temporary electric power transmission for placement detection, position detection, and the like. That is, the power is transmitted for detecting whether or not the electric apparatus is placed on the charger as shown in F2 of FIG. 7, and, if the electric apparatus is placed, whether or not the electric apparatus is placed on an appropriate position. The driving frequency (a frequency of a driving clock from the driving clock generating circuit) in the temporary power transmission is set to f1 (f0), for example.

The temporary power transmission from the power transmission side allows the power receiving side to be turned on (step S22), whereby a reset of the power receiving control device 50 is released. Then, the power receiving control device 50 sets the signal P1Q shown in FIG. 9 to H level. As a result, the transistor T132 of the power feeding control section 48 is turned off (step S23), so that the electrical connection between the power receiving side and the load 90 is interrupted.

Next, the power receiving side determines by using the position detection circuit 56 whether or not a positional relation (a position level) between the primary coil L1 and the secondary coil L2 is appropriate (step S24). If the positional relation is not appropriate, the power receiving side waits, for example, for a period of k2 seconds (step S21).

On the other hand, if the positional relation is appropriate, the power receiving side makes a negotiation frame so as to transmit it to the power transmission side (step S25). Specifically, by the load modulation described in FIG. 10, the negotiation frame is transmitted. The negotiation frame includes a matching code such as standard information and coil information, system information (load state detection method), and hardware information such as threshold information (threshold for detecting a load state) stored in the storing section 53 on the power receiving side.

When receiving the negotiation frame (step S4), the power transmission side verifies the negotiation frame (step S5).

Specifically, the power transmission side confirms whether or not the standard/coil/system information stored in the storing section 23 on the power transmission side and the standard/coil/system information received from the power receiving side are matched. Then, if the negotiation frame is determined to be appropriate, foreign object detection is performed (step S6).

Specifically, the power transmission side sets the driving frequency to a frequency f3 for detecting a foreign object. Then, based on the threshold information (safety threshold information) received from the power receiving side, the first foreign object detection before the start of normal power transmission is performed so as to determine whether or not a load state of the power receiving side is appropriate. For example, a foreign object detection enable signal is activated so as to instruct the load state detection circuit 30 to start detecting a foreign object. The foreign object detection can be realized by comparing, for example, load state detection information (pulse width information) from the load state detection circuit 30 with a threshold (META) for detecting a load state received from the power receiving side. After the period of detecting a foreign object ends, the power transmission side changes the driving frequency to the frequency f1 (f01).

If the negotiation frame is determined to be inappropriate in the step S5 or a foreign object is detected in the step S6, the power transmission side stops power transmission so as to return to the step S1.

Next, the power transmission side makes a negotiation frame so as to transmit it to the power receiving side (step S7). The negotiation frame includes, for example, the standard information, the coil information, and the system information stored in the storing section 23 on the power transmission side.

When receiving the negotiation frame (step S26), the power receiving side verifies the negotiation frame (step S27). Specifically, the power receiving side confirms whether or not the standard/coil/system information stored in the storing section 53 on the power receiving side and the standard/coil/system information received from the power transmission side are matched. Then, if the negotiation frame is determined to be appropriate, the power receiving side generates a setup frame so as to transmit it to the power transmission side (step S28). The setup frame includes communication condition information, transmission condition information, and corresponding function information, for example. The communication condition information includes the communication method, the communication parameter, and the like. The transmission condition information includes the driving voltage and the driving frequency of the primary coil, and the like. The corresponding function information represents an additional function for each application. If the setup frame is not appropriate, the procedure returns to the step S21.

When receiving the setup frame (step S8), the power transmission side verifies the setup frame (step S9). If the setup frame from the power receiving side is appropriate, the power transmission side makes a setup frame on the power transmission side so as to transmit it to the power receiving side (step S10). On the other hand, if the setup frame is not appropriate, the power transmission side stops power transmission so as to return to the step S1.

When receiving the setup frame (step S29), the power receiving side verifies the setup frame (step S30). If the setup frame is appropriate, the power receiving side makes a start frame so as to transmit it to the power transmission side (step S31). On the other hand, if the setup frame is not appropriate, the power receiving side returns to the step S21.

If the start frame is transmitted, the power transmission side and the power receiving side move to a command branch (steps S41 and S61). That is, a command determination is performed so as to be split into one of command processings corresponding to each flag.

Specifically, if there is no command requiring a priority processing (e.g., an interruption command), the power transmission side transmits the normal power transmission (a charge) start command to the power receiving side (step S42). When receiving the normal power transmission start command (step S62), the power receiving side determines whether or not the positional relation between the primary coil L1 and the secondary coil L2 is appropriate (step S63). If it is appropriate, a response command is transmitted to the power transmission side (step S64).

When receiving the response command (step S43), the power transmission side switches the transmission condition and the communication condition to those for normal power transmission (step S44). Specifically, the conditions are switched to the transmission condition and the communication condition set in the setup processing. Then, periodic authentication is turned on (step S45), and normal power transmission starts (step S46).

After transmitting the response command (step S64), the power receiving side turns on the transistor TB2 of the power feeding control section 48 (step S65) so as to start power supply to the load 90. The periodic authentication is turned on so as to perform a periodic load modulation (step S66). Specifically, the transistor TB3 of the load modulation section 46 is turned on/off in accordance with a predetermined pattern in a periodic authentication period.

After the start of normal power transmission, in the periodic authentication period performed by the periodic load modulation, the power transmission side performs takeover state detection, which the detection is caused by a metal foreign object and the like having a large area (step S47). Subsequently, removal detection and foreign object detection are performed (steps S48 and S49). If any takeover is detected in the periodic authentication, or a removal or a foreign object is detected, the power transmission is stopped so as to return to the step S1.

After the start of normal power transmission, the power receiving side detects whether or not the battery 94 is fully charged (step S67). If the full charge is detected, the transistor TB2 is turned off (step S68), and the power supply to the load 90 is stopped. Subsequently, the periodic authentication is turned off (step S69). Then, a full charge detection command (a save frame) that notifies the detection of a full charge is transmitted to the power transmission side (step S70), and after a wait period of k4 seconds (step S71), the processing of the step 70 is repeated.

When receiving the full charge detection command (the save frame), the power transmission side turns off the periodic authentication, and stops the power transmission (steps S51 and S52). Then, the power transmission side moves to the standby phase after the detecting of the full charge (step S53).

In the standby phase after the detection of the full charge, for example, removal detection is performed once every k3 seconds (step S54). Then, if a removal is detected, the recharge confirmation flag is reset to 0 (step S57), and the power transmission is stopped so as to return to the step S1.

In the standby phase after the detection of the full charge, for example, a recharge is confirmed once every k3×j seconds, and the recharge confirmation flag is set to 1 (step S55 and S56). Then, the power transmission is stopped so as to return to the step S1. In this case, the negotiation processing and the setup processing are performed. Since the recharge confirmation flag is 1 in the command branch of the step S41, the power transmission side moves to the processing of the recharge confirmation command.

Figure 11:
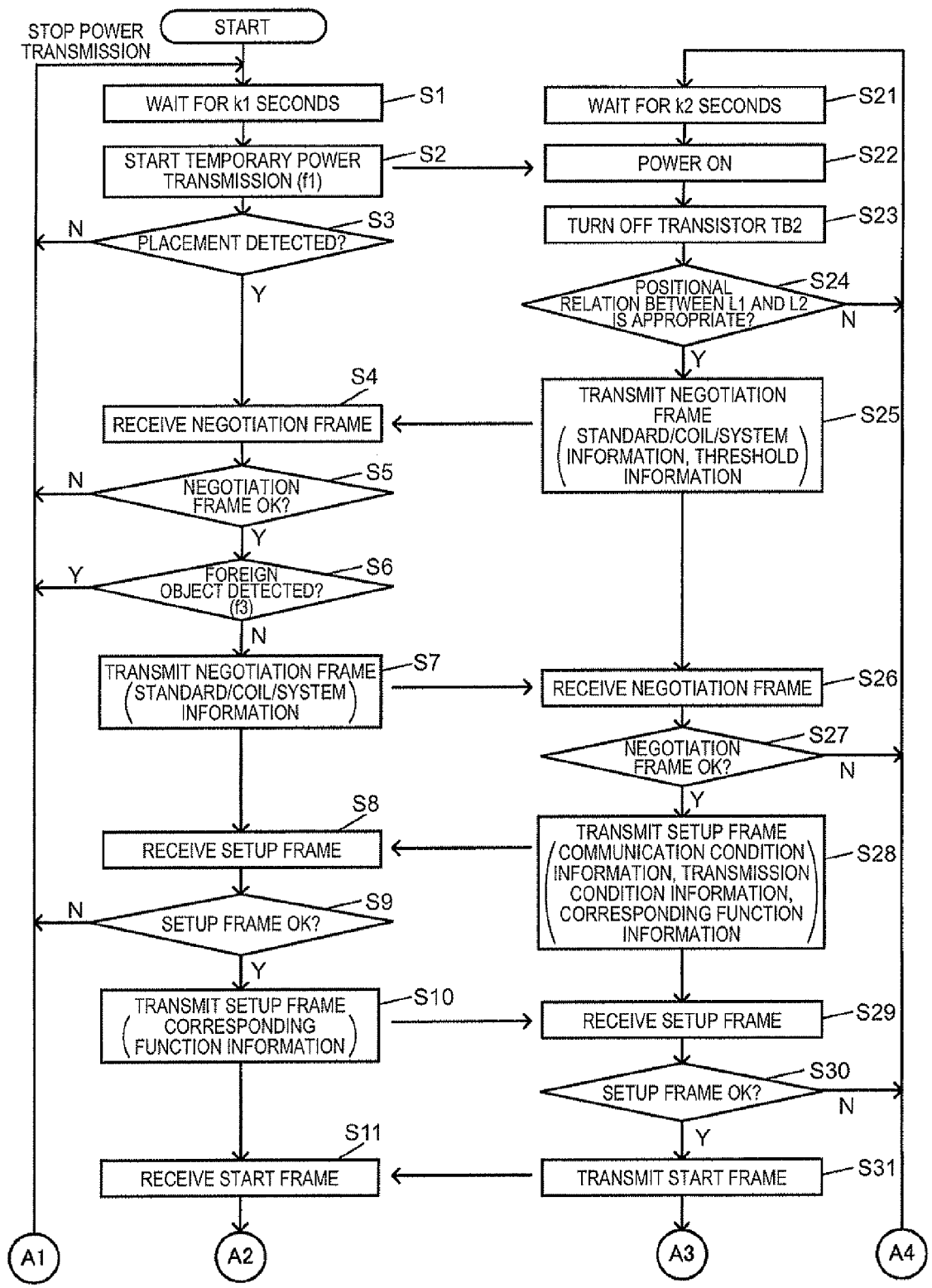
FIG. 11 is a flowchart explaining the operation according to the embodiment.
Figure 12:
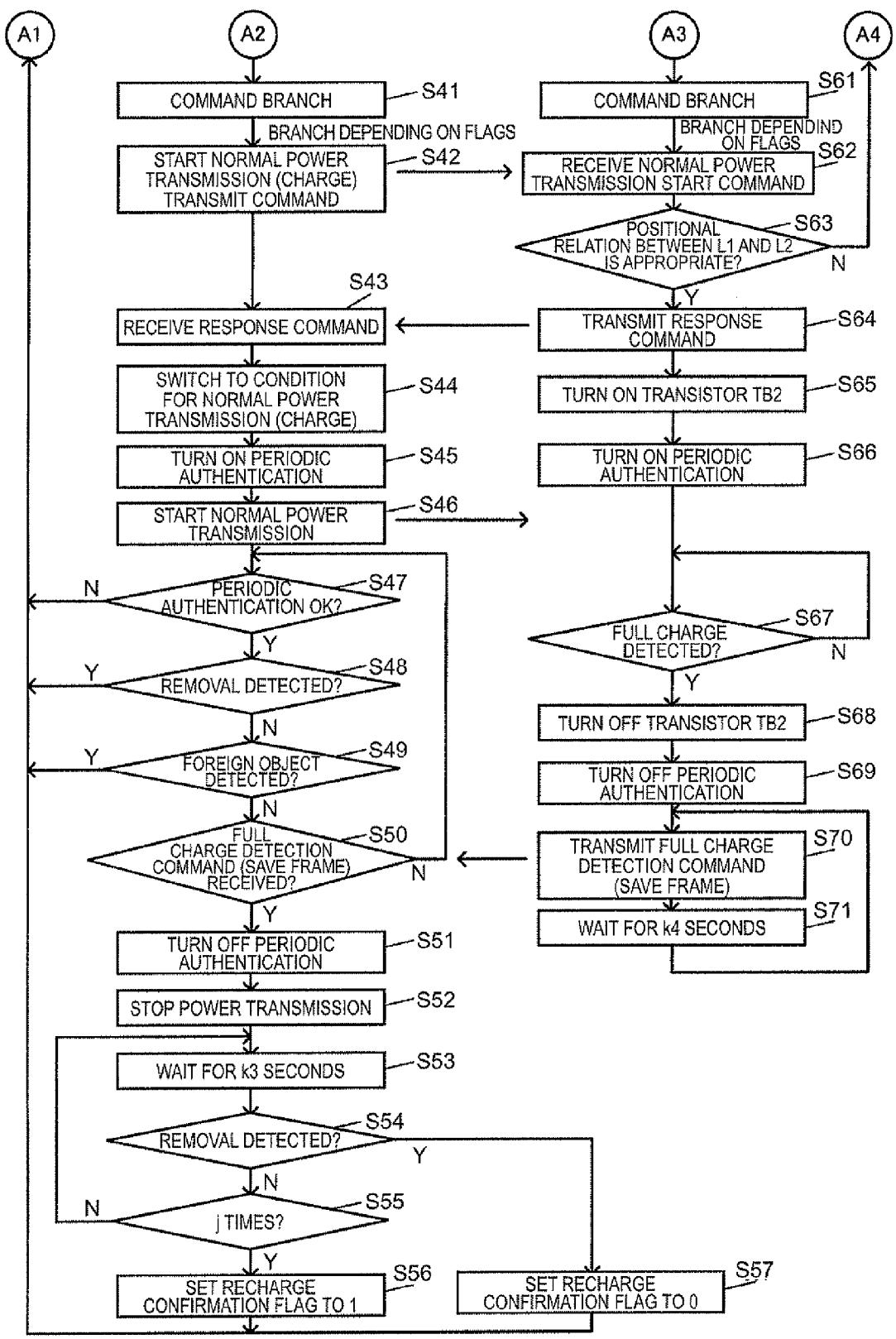
FIG. 12 is a flowchart explaining the operation according to the embodiment.

In the embodiment, as shown in the steps S8 and S28 of FIG. 11, the communication condition information and the transmission condition information are transmitted to the power transmission side from the power receiving side by the setup frame. As shown in the step S44 of FIG. 12, after the start of normal power transmission, the communication condition and the transmission condition are set based on the communication condition information and the transmission condition information in the setup frame. As a result, communication between the power transmission side and the power receiving side, and the power control of contactless power transmission can be realized.

7. Communication Method

In the embodiment, the communication method can be set so as to differ from before and after the start of normal power transmission by switching the communication conditions. Various communication methods can be assumed as ones to be switched Examples of the communication methods to be switched are described below.

Figure 13A:
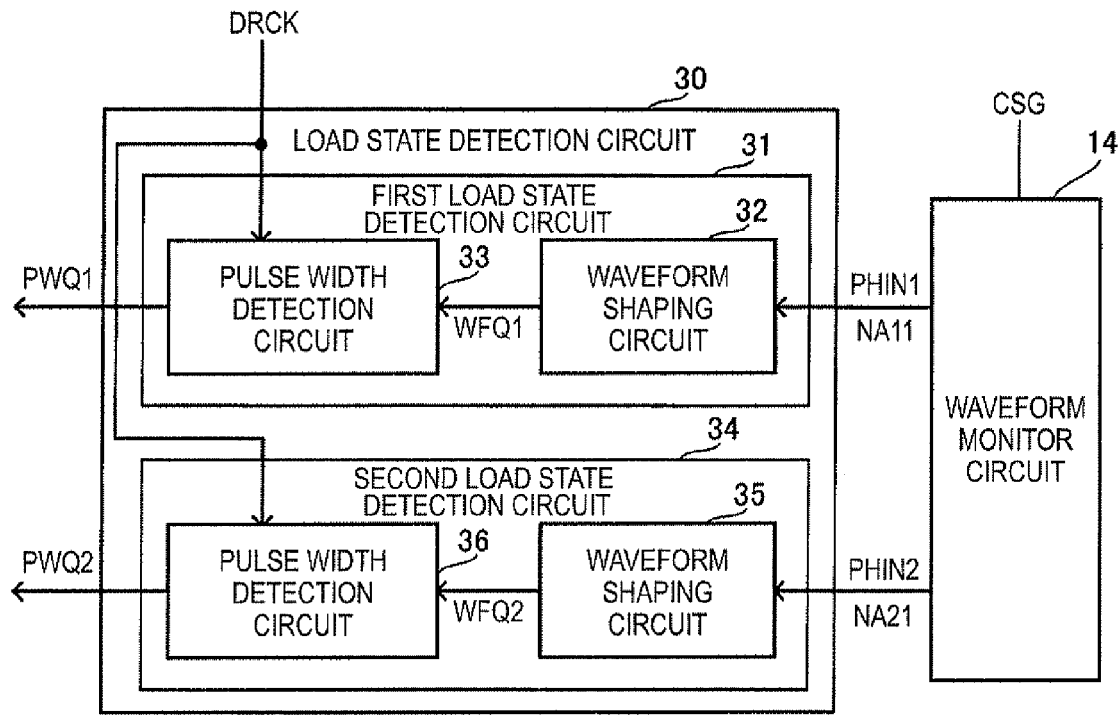
FIGS. 13A, 13B, and 13C are schematic views explaining a first communication method and a second communication method.

FIG. 13A shows a structural example of the load state detection circuit 30. The load state detection circuit 30 includes a first load state detection circuit 31 and a second load state detection circuit 34.

The first load state detection circuit 31 includes a waveform shaping circuit 32 and a pulse width detection circuit 33, and detects pulse width information (PWQ1), by the first communication method (a first pulse width detection method) to output it to the controller 22. For example, a pulse width period XTPW1 is measured. The pulse width period XTPW1 is a period between an edge timing (e.g., rising timing) of a driving clock DRCK outputted from the driving clock generating circuit 25 and a timing at which an induced voltage signal PHIN1 (coil terminal signal CSG) outputted from the waveform monitor circuit 14 rises to over a given threshold voltage VTL.

The second load state detection circuit 34 includes a waveform shaping circuit 35 and a pulse width detection circuit 36, and detects pulse width information (PWQ2) by the second communication method (a second pulse width detection method) to output it to the controller 22. For example, a pulse width period XTPW2 is measured. The pulse width period XTPW2 is a period between an edge timing (e.g., falling timing) of the driving clock DRCK and a timing at which an induced voltage signal PHIN2 (coil terminal signal CSG) falls to be under a given threshold voltage VTH.

Figure 13B:
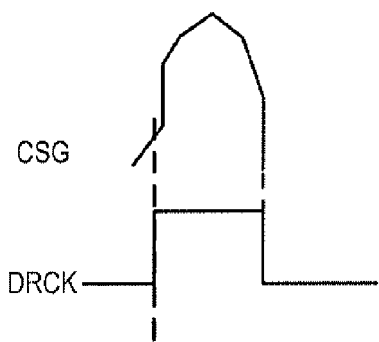
Figure 13C:
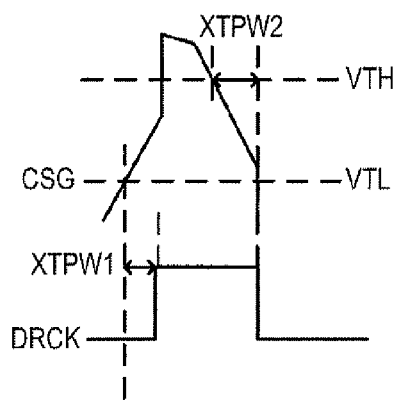

FIG. 13B shows an example of the waveform of the coil terminal signal CSG in a case where the load of the power receiving side (the secondary side) is low (a load current is small) while FIG. 13C shows another example of the waveform of the coil terminal signal CSG in a case where the load of the power receiving side is high (a load current is large). As shown in FIGS. 13B and 13C, as the load of the power receiving side increases the waveform of the coil terminal signal CSG is distorted.

In the first communication method, as shown in FIG. 13C, the pulse width period XTPW1 relating to the rising of the coil terminal signal CSG is detected and compared with a first threshold for detecting a pulse width so as to detect load fluctuation. In the second communication method, the pulse width period XTPW2 relating to the falling of the coil terminal signal CSG is detected and compared with a second threshold for detecting a pulse width so as to detect load fluctuation. The first communication method has an advantage of having low variation in pulse width detection against fluctuation of a power supply voltage and the like as compared with the second communication method, but has a disadvantage of having low sensitivity against load fluctuation. However, the sensitivity against load fluctuation can be increased by setting the driving frequency close to the coil resonant frequency in communication with the first communication method, whereby the waveform is largely distorted with respect to load fluctuation.

Accordingly, a communication method is employed most suitably for each of periods before and after the start of normal power transmission, i.e., the first communication method is employed in one of the periods while the second communication method is employed in the other of the periods. As a result, communication quality can be improved.

Figure 14A:
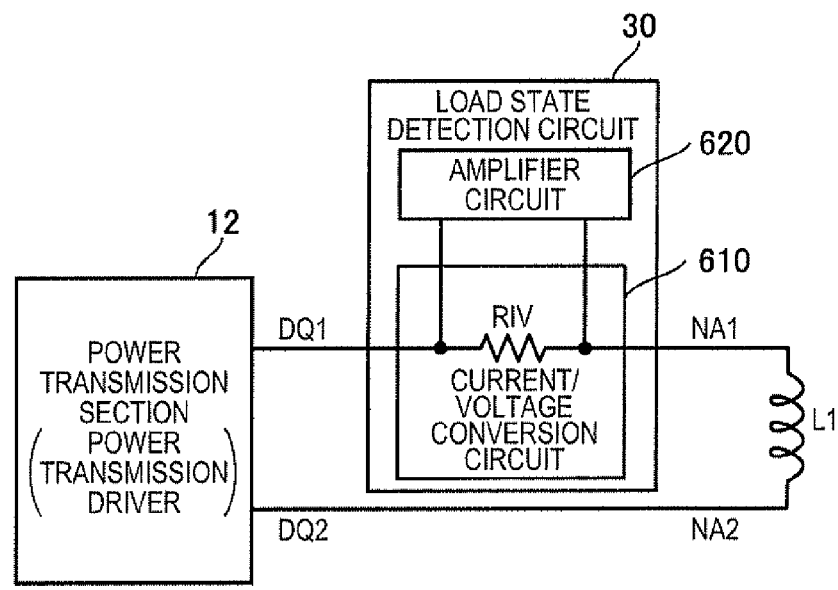
FIGS. 14A and 14B are schematic views explaining a third communication method and a fourth communication method.

As for the communication method, various methods can be assumed. FIG. 14A shows an example of a third communication method detecting a load state by current detection. In FIG. 14A, the load state detection circuit 30 includes a current/voltage conversion circuit 610 and an amplifier circuit 620. The current/voltage conversion circuit 610 including a resistor RIV detects a current flowing at the coil terminal and converts it into a voltage. The converted voltage is amplified by the amplifier circuit 620. Based on a signal after the amplification, a load state on the power receiving side is detected. Specifically, the load state on the power receiving side can be detected by comparing the phase difference between the coil terminal current and the coil terminal voltage.

Figure 14B:
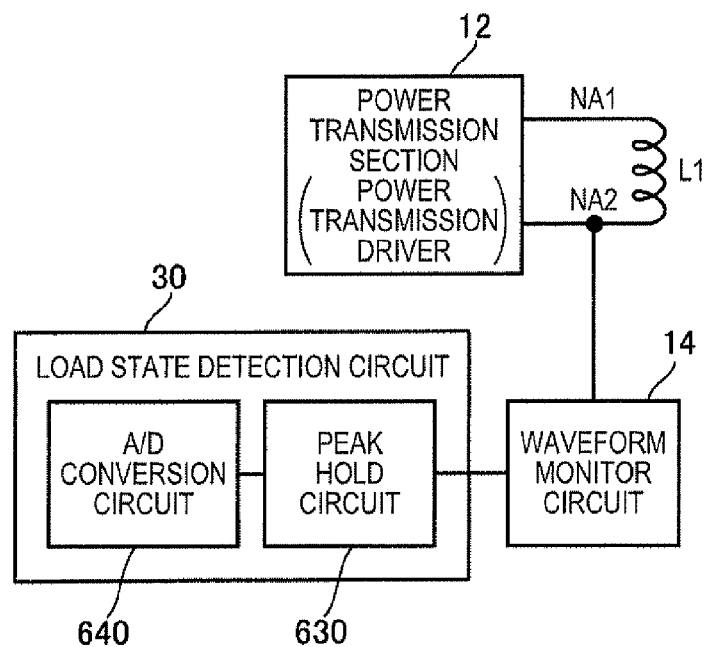

FIG. 14B shows an example of a fourth communication method detecting a load state by amplitude detection. In FIG. 14B, the load state detection circuit 30 includes a peak hold circuit (amplitude detection circuit) 630 and an A/D conversion circuit 640. The peak hold circuit 630 holds a peak of the induced voltage signal PHIN from the waveform monitor circuit 14, and detects a peak voltage (amplitude information in a broad sense). The A/D conversion circuit 640 converts the detected peak voltage into digital data. The controller 22 determines the load state of the power receiving side based on the digital data. For example, the controller determines that the load on the power receiving side is low when the peak voltage (amplitude) is small while the load on the power receiving side is high when the peak voltage is large.

In the embodiment, any one of from the first to the fourth communication methods described in FIGS. 3A to 14B is employed in one of periods before and after the start of normal power transmission while another method out of the first to the fourth communication methods can be employed in the other of the periods. Accordingly, the communication method most suitably for each period can be employed. As a result, quality and reliability of the communication can be improved.

8. Periodic Authentication

The periodic authentication will now be described. In the periodic authentication, a load on the power receiving side is intermittently varied in each periodic authentication period of the normal power transmission, and the intermittent load fluctuation is detected on the power transmission side so as to detect what is called a takeover state by a foreign object.

That is, the negotiation processing and the set up processing end, and subsequently the normal power transmission (main transmission) starts. After the start of normal power transmission, a metal foreign object having a large area may be inserted between the primary coil L1 and the secondary coil L2. A metal object having a small or a medium area can be detected by monitoring the induced voltage signal of the primary coil L1. However, if the metal object having a large are is inserted, the transmission side deems the metal object as a load such as the main load. Therefore, since the negotiation processing and the like are completed, the power transmission side deems the metal foreign object as a load and continues the power transmission. Transmitted energy from the power transmission side is continuously consumed by the metal foreign object. This consumption causes a problem in that the metal foreign object is heated to high temperature. In the embodiment, such phenomenon is called a "takeover state" that the original apparatus on the power receiving side is replaced by the metal foreign object having a large area and the like and the power is continuously transmitted to the foreign object.

Figure 15:
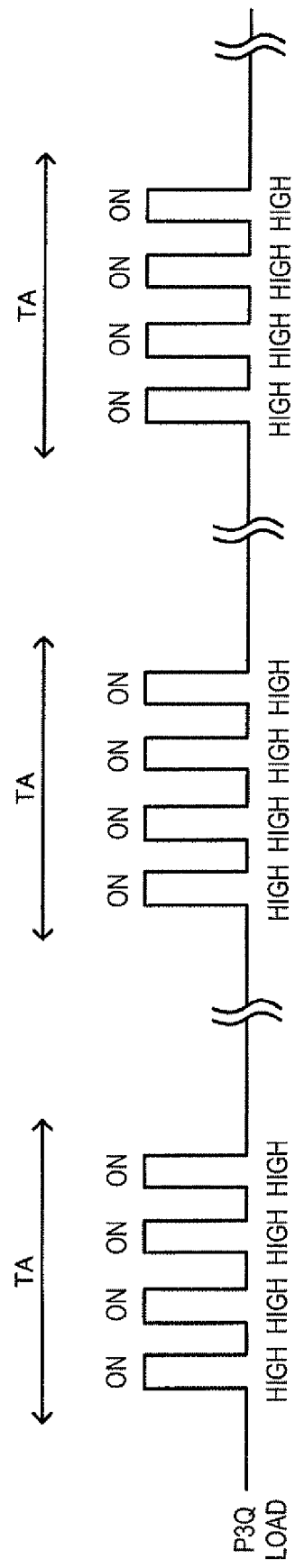
FIG. 15 is an explanatory diagram of a periodic authentication.

In order to detect the takeover state, the load on the power receiving side is intermittently varied during a periodic authentication period TA in FIG. 15. Specifically, a load modulation signal P3Q is intermittently varied so that the transistor TB3 of the load modulation section 46 is intermittently turned on/off. When the transistor TB3 is turned on, the power receiving side is relatively set to be in a high load state (small impedance). On the other hand, when the transistor is turned off, the power receiving side is relatively set to be in a low load state (high impedance). The load state detection circuit 30 on the power transmission side detects the intermittent load fluctuation of the power receiving side. For example, a variation in the pulse width period of the coil terminal signal is detected so as to detect the load fluctuation of the power receiving side. For example, the low load and high load states are determined by using the thresholds LEVL and LEVH.

The optimum value of the thresholds LEVEL and LEVH used for the periodic authentication may differ in accordance with power specifications of the power receiving devices. Thus, the thresholds LEVL and LEVH are preferably variably controllable in accordance with the power receiving devices in order to achieve a power transmission system corresponding with multiple power specifications.

In this regard, in the embodiment, the thresholds LEVL and LEVH used for the periodic authentication are transmitted to the power transmission side from the power receiving side in the setup processing as described in FIG. 8. The power transmission side performs the determination processing on the periodic authentication by using the thresholds LEVL and LEVH. Accordingly, the determination processing on the periodic authentication can be performed by using the optimum thresholds LEVEL and LEVH in accordance with the power specifications of the power receiving devices. As a result, the periodic authentication can be realized in the power transmission system corresponding with multiple power specifications.

While the embodiment has been described in detail above, it will be understood by those skilled in the art that a number of modifications can be made to this embodiment without substantially departing from new matters and advantages of this invention. Therefore, it is to be noted that these modifications are all included in the scope of the invention. For example, terms referred to as different terms having broader meanings or having the same definitions of the terms in the specification and drawings can be replaced with the different terms in any part of the specification and drawings. Further, combinations of the embodiment and the modifications can be included in the scope of the invention. Also, the configurations and the operations of the power transmission control device, the power transmission device, the power receiving control device, and the power receiving device, and further the setting method of communication conditions, the method of negotiation, setup, and command processings, and the like are not limited to what have been described in the embodiment, and various modifications can be made thereto.

What is claimed is:

1. A power transmission control device provided in a power transmission device included in a contactless power transmission system in which power is transmitted from the power transmission device to a power receiving device by electromagnetically coupling a primary coil and a secondary coil and the power is supplied to a load of the power receiving device, the power transmission control device comprising:
   a controller that controls the power transmission control device, the controller including:
      a communication condition setting section that sets a communication condition by exchanging information with the power receiving device, the communication condition being at least one of a communication method between the power transmission device and the power receiving device and a communication parameter;
      a communication processing section that communicates between the power transmission device and the power receiving device by using the set communication condition; and
   a negotiation processing section that negotiates contactless power transmission, the negotiation section performing a collation processing on system information showing standard information, coil information, and a load state detection method with respect to the power receiving device.

2. The power transmission control device according to claim 1, the communication processing section performing, by using the communication condition, a communication processing after a start of normal power transmission between the power transmission device and the power receiving device.

3. The power transmission control device according to claim 2, the communication processing section performing the communication processing between the power transmission device and the power receiving device by using an initial communication condition before the start of the normal power transmission, and the communication condition setting section exchanging information with the power receiving device in a communication processing before the start of the normal power transmission using the initial communication condition so as to set the communication condition used in the communication processing after the start of the normal power transmission.

4. The power transmission control device according to claim 1, in a case where a communication from the power transmission device to the power receiving device is performed by a frequency modulation, the communication condition setting section setting a frequency in the frequency modulation as the communication parameter of the communication condition.

5. The power transmission control device according to claim 1, in a case where a communication from the power receiving device to the power transmission device is performed by a load modulation, the communication condition setting section setting a threshold in the load modulation as the communication parameter of the communication condition.

6. The power transmission control device according to claim 1, in a case where a periodic authentication is performed from the power receiving device to the power transmission device after the start of the normal power transmission, the communication condition setting section setting a threshold for the periodic authentication as the communication parameter of the communication condition.

7. The power transmission control device according to claim 1, the communication condition setting section receiving communication condition information from the power receiving device so as to set the communication condition.

8. The power transmission control device according to claim 7, the controller including:
- a negotiation processing section that negotiates contactless power transmission; and
- a setup processing section that setups the contactless power transmission based on a result of the negotiation processing, and the communication condition setting section receiving the communication condition information from the power receiving device by the setup processing.

9. A power transmission device, comprising:
- the power transmission control device according to claim 1; and
- a power transmission section generating an alternating-current voltage so as to supply the voltage to the primary coil.

10. An electronic apparatus, comprising the power transmission device according to claim 9.

11. The power transmission control device according to claim 1, the information exchanged includes (1) a first negotiation frame containing threshold information generated by and transmitted from the power receiving device in response to a power supply voltage supplied by the power transmission device to the power receiving device, (2) a second negotiation frame containing system information generated by and transmitted from the power transmission device in response to the first negotiation frame from the power receiving device, and (3) a setup frame containing communication condition generated by and transmitted from the power receiving device in response to the second negotiation frame from the power transmission device.

12. A power receiving control device provided in a power receiving device included in a contactless power transmission system in which power is transmitted from a power transmission device to the power receiving device by electromagnetically coupling a primary coil and a secondary coil and the power is supplied to a load of the power receiving device, the power transmission device including a negotiation processing section that negotiates contactless power transmission, the negotiation section performing a collation process on system information showing standard information, coil information, and a load state detection method with respect to the power receiving device, the power receiving control device comprising:
- a controller that controls the power receiving control device, the controller including:
  - a communication condition setting section that sets a communication condition by exchanging information with the power transmission device, the communication condition being at least one of a communication method between the power transmission device and the power receiving device and a communication parameter; and
  - a communication processing section that communicates between the power transmission device and the power receiving device by using the set communication condition.

13. The power receiving control device according to claim 12, the communication processing section performing, by using the communication condition, a communication processing after a start of normal power transmission between the power transmission device and the power receiving device.

14. The power receiving control device according to claim 12, the communication processing section performing the communication processing between the power transmission device and the power receiving device by using an initial communication condition before the start of the normal power transmission, and the communication condition setting section exchanging information with the power transmission device in a communication processing before the start of the normal power transmission so as to set the communication condition used in the communication processing after the start of the normal power transmission.

15. The power receiving control device according to claim 12, the communication condition setting section transmitting communication condition information to the power transmission device so as to set the communication condition.

16. The power receiving control device according to claim 15, the controller including:
- a negotiation processing section performing a negotiation processing of contactless power transmission; and
- a setup processing section performing a setup processing of the contactless power transmission based on a result of the negotiation processing, and the communication condition setting section transmitting the communication condition information to the power transmission device by the setup processing.

17. A power receiving device, comprising:
- the power receiving control device according to claim 12; and
- a power receiving section converting an induced voltage of the secondary coil into a direct-current voltage.

18. An electronic apparatus, comprising:
- the power receiving device according to claim 17; and
- a load to which power is supplied by the power receiving device.

19. The power receiving control device according to claim 12, the information exchanged includes (1) a first negotiation frame containing threshold information generated by and transmitted from the power receiving device in response to a power supply voltage supplied by the power transmission device to the power receiving device, (2) a second negotiation frame containing system information generated by and transmitted from the power transmission device in response to the first negotiation frame from the power receiving device, and (3) a setup frame containing communication condition generated by and transmitted from the power receiving device in response to the second negotiation frame from the power transmission device.

* * * * *